(12) United States Patent
Hinton et al.

(10) Patent No.: US 8,607,322 B2
(45) Date of Patent: Dec. 10, 2013

(54) METHOD AND SYSTEM FOR FEDERATED PROVISIONING

(75) Inventors: Heather Maria Hinton, Austin, TX (US); Brian James Turner, Santa Cruz, CA (US); Anthony Scott Moran, Santa Cruz, CA (US); Shane Weeden, Santa Cruz, CA (US); Ian Michael Glazer, Washington, DC (US); Gavin George Bray, Robina (AU); Venkat Raghavan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2331 days.

(21) Appl. No.: 10/896,351

(22) Filed: Jul. 21, 2004

(65) Prior Publication Data
US 2006/0021019 A1 Jan. 26, 2006

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/10

(58) Field of Classification Search
USPC .......................................................... 726/10
See application file for complete search history.

(56) References Cited

U.S. PATENT DOCUMENTS

| | | | |
|---|---|---|---|
| 6,763,468 B2 * | 7/2004 | Gupta et al. ..................... 726/2 |
| 2003/0163733 A1 * | 8/2003 | Barriga-Caceres et al. .. 713/201 |
| 2003/0177388 A1 * | 9/2003 | Botz et al. ..................... 713/201 |
| 2005/0111466 A1 * | 5/2005 | Kappes et al. ................ 370/400 |

* cited by examiner

*Primary Examiner* — William Powers
*Assistant Examiner* — Dant Shaifer Harriman
(74) *Attorney, Agent, or Firm* — Jeffrey S. LaBaw; David H. Judson

(57) ABSTRACT

A method and a system are presented in which federated domains interact within a federated environment. Domains within a federation can initiate federated single-sign-on operations for a user at other federated domains. A point-of-contact server within a domain relies upon a trust proxy within the domain to manage trust relationships between the domain and the federation. Trust proxies interpret assertions from other federated domains as necessary. Trust proxies may have a trust relationship with one or more trust brokers, and a trust proxy may rely upon a trust broker for assistance in interpreting assertions. When a user is provisioned at a particular federated domain, the federated domain can provision the user to other federated domains within the federated environment. A provision operation may include creating or deleting an account for a user, pushing updated user account information including attributes, and requesting updates on account information including attributes.

25 Claims, 11 Drawing Sheets

*FIG. 2B*
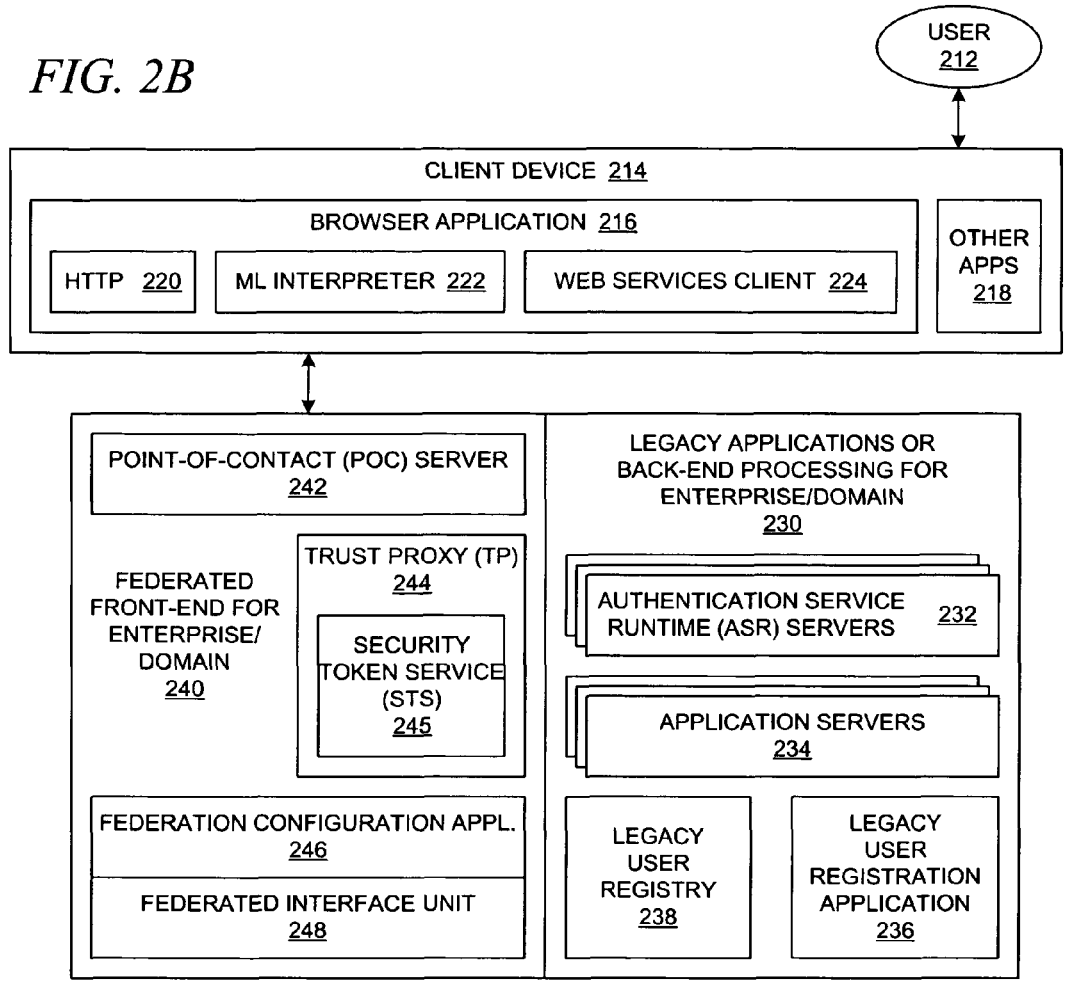
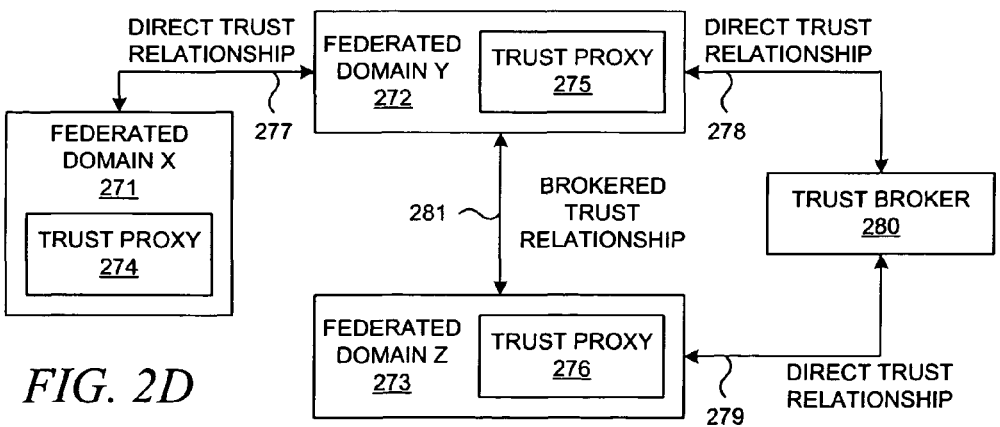
*FIG. 2D*

METHOD AND SYSTEM FOR FEDERATED PROVISIONING

CROSS-REFERENCE TO RELATED APPLICATIONS

The present application is related to the following applications with a common assignee:

U.S. patent application Ser. No. 10/334,273, filed Dec. 31, 2002, titled "Local Architecture for Federated Heterogeneous System".

BACKGROUND OF THE INVENTION

1. Field of the Invention

The present invention relates to an improved data processing system and, in particular, to a method and apparatus for multicomputer data transferring. Still more particularly, the present invention is directed networked computer systems.

2. Description of Related Art

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources. Users generally desire the ability to change from interacting with one application to another application without regard to authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user.

Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications have a Web-based user interface that is accessible through a common browser, users expect more user-friendliness and low or infrequent barriers to movement from one Web-based application to another. In this context, users are coming to expect the ability to jump from interacting with an application on one Internet domain to another application on another domain without regard to the authentication barriers that protect each particular domain. However, even if many systems provide secure authentication through easy-to-use, Web-based interfaces, a user may still be forced to reckon with multiple authentication processes that stymie user access across a set of domains. Subjecting a user to multiple authentication processes in a given time frame may significantly affect the user's efficiency.

Various techniques have been used to reduce authentication burdens on users and computer system administrators. These techniques are generally described as "single-sign-on" (SSO) processes because they have a common purpose: after a user has completed a sign-on operation, i.e. been authenticated, the user is subsequently not required to perform another authentication operation. Hence, the goal is that the user would be required to complete only one authentication process during a particular user session.

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely the user's home domain for primary management of the user's authentication credentials, e.g., accepting a single-sign-on token that is provided by the user's home domain.

However, this federated approach to authentication does not relieve a given federation partner from provisioning a user. Provisioning can be been defined as the automation of processes for creating, modifying, revoking, or otherwise managing user-related access entitlements and data for computational resources, e.g., electronically available web services. In other words, cooperation amongst enterprises within a federation does not relieve a given federation partner of the necessity of maintaining and managing a local account for a particular user such that the local account contains user-specific information with respect to the given federation partner, thereby allowing the given federated partner to manage accessibility to resources at the given federated partner with respect to that particular user.

Hence, when a user is provisioned to a home domain, there is a need to provision the user in some manner to federated partners; otherwise, the user may discover that resources at the federated partners are inaccessible, thereby defeating the purpose of the federation. Therefore, it would be advantageous to have methods and systems in which enterprises can provision users within a federation.

SUMMARY OF THE INVENTION

A method, apparatus, system, and computer program product are presented in which federated domains interact within a federated environment. Domains within a federation can initiate federated single-sign-on operations for a user at other federated domains. A point-of-contact server within a domain relies upon a trust proxy/trust service within the domain to manage trust relationships between the domain and the federation. Trust proxies interpret assertions from other federated domains as necessary. Trust proxies may have a trust relationship with one or more trust brokers, and a trust proxy may rely upon a trust broker for assistance in interpreting assertions. When a user is provisioned at a particular federated domain, the federated domain can provision the user to other federated domains within the federated environment. A provision operation may include creating or deleting an account for a user, pushing updated user account information including attributes, and requesting updates on account information including attributes.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2B depicts a block diagram that illustrates the integration of pre-existing systems at a given domain with some of the federated architecture components of the present invention in accordance with an embodiment of the present invention;

FIG. 2D depicts a block diagram that illustrates an exemplary set of trust relationships between federated domains using trust proxies and a trust broker in accordance with the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
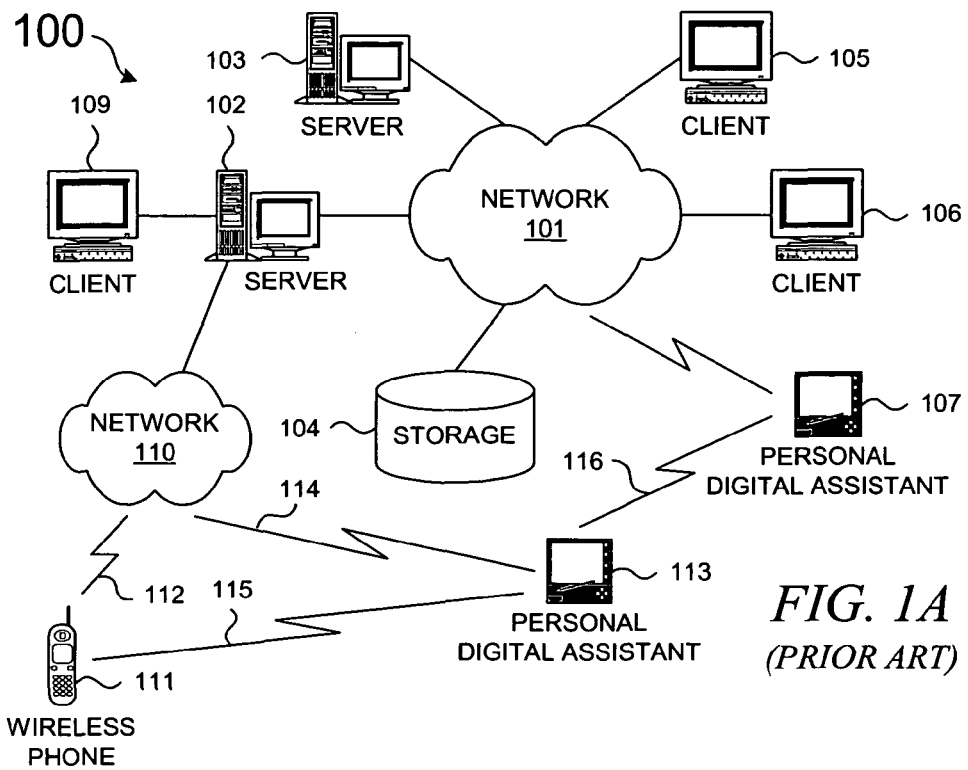
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
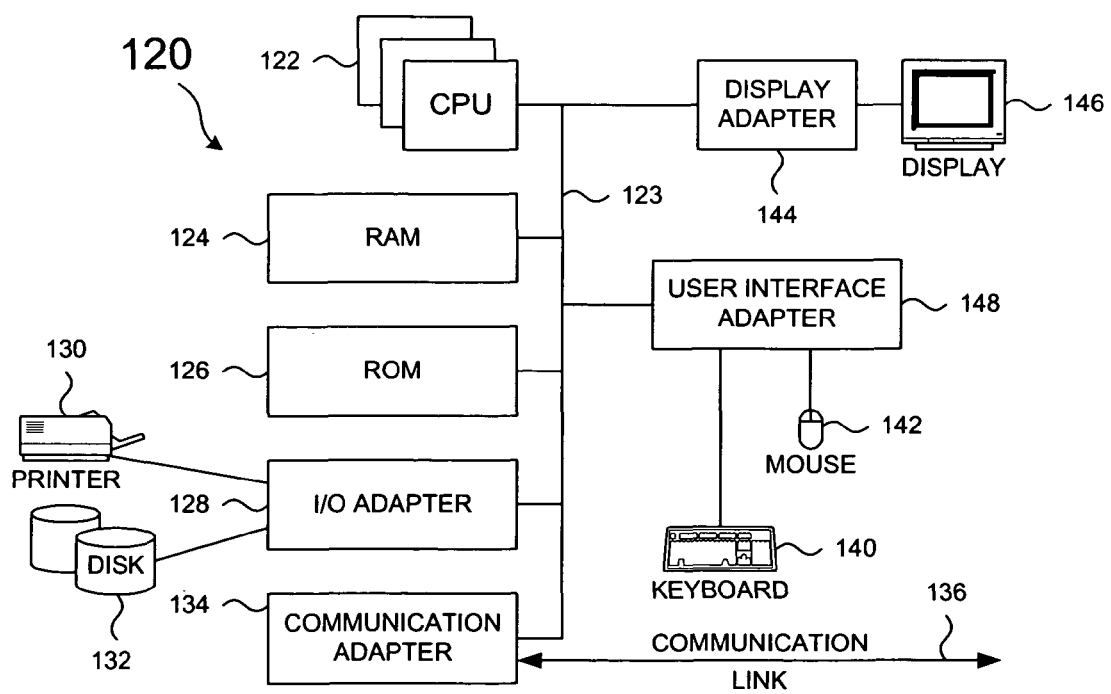
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
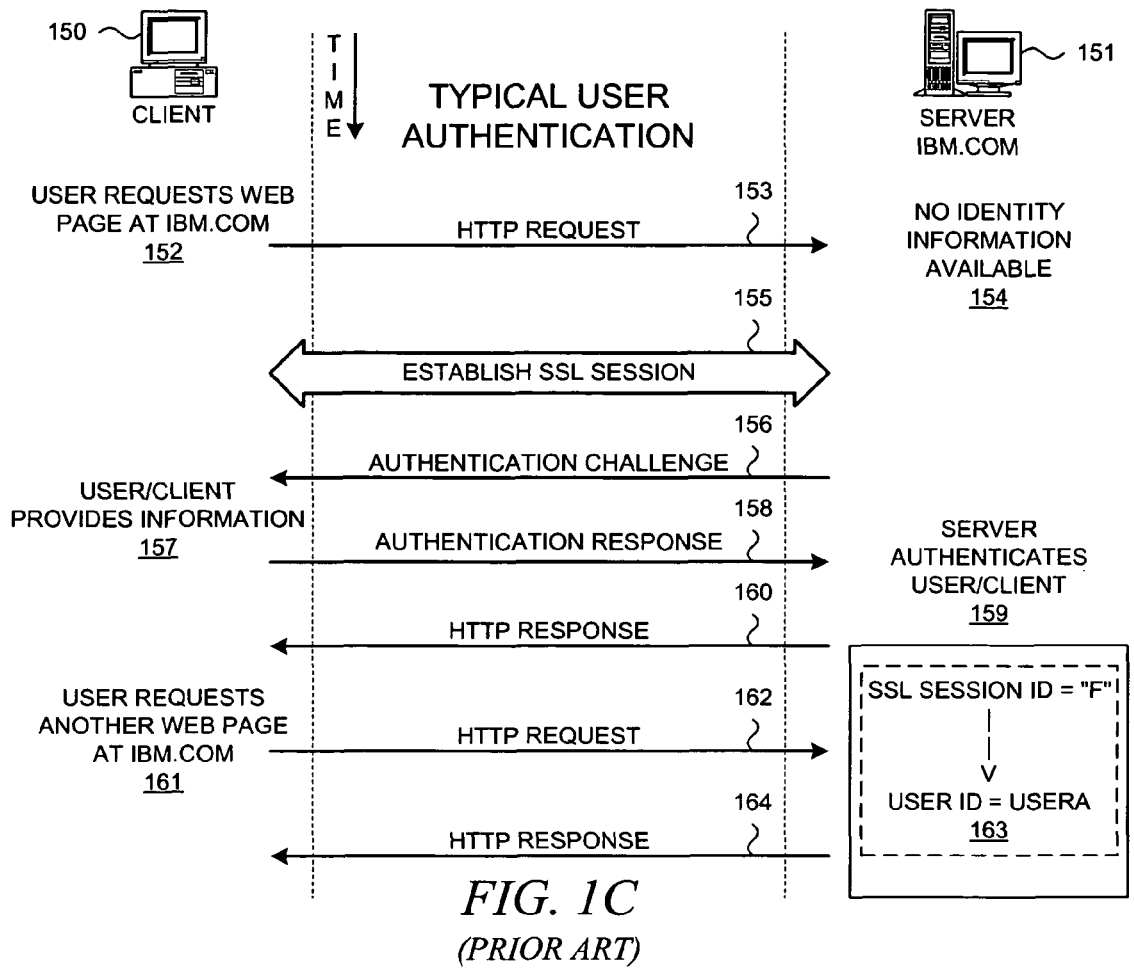
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and/or authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information. Alternatively, authentication could be based on an identity asserted in a certificate that is used for mutually authenticated SSL.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client. The server creates a session identifier for the client, and any subsequent request messages from the client within the session would be accompanied by the session identifier.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163) because the user's session identifier is returned to the server in the HTTP request message, and the server sends the requested web page back to the client in another HTTP response message (step 164). Although FIG. 1C depicts a typical prior art process, it should be noted that other alternative session state management techniques may be depicted, such as URL rewriting or using cookies to identify users with active sessions, which may include using the same cookie that is used to provide proof of authentication.

Figure 1D:
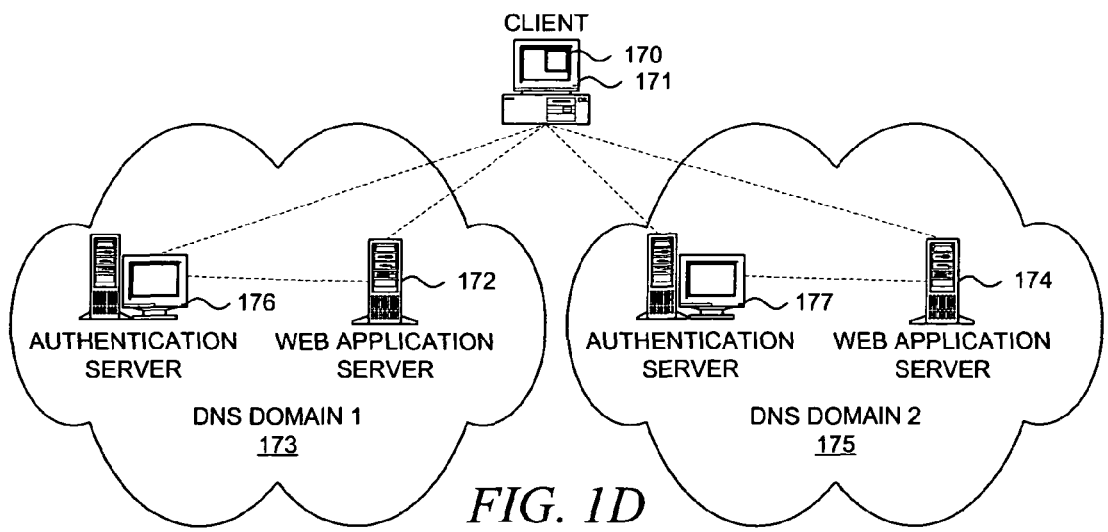
FIG. 1D depicts a network diagram that illustrates a typical Web-based environment in which the present invention may be implemented.

With reference now to FIG. 1D, a network diagram illustrates a typical Web-based environment in which the present invention may be implemented. In this environment, a user of a browser 170 at client 171 desires to access a protected resource on web application server 172 in DNS domain 173, or on web application server 174 in DNS domain 175.

In a manner similar to that shown in FIG. 1C, a user can request a protected resource at one of many domains. In contrast to FIG. 1C, which shows only a single server at a particular domain, each domain in FIG. 1D has multiple servers. In particular, each domain may have an associated authentication server 176 and 177.

In this example, after client 171 issues a request for a protected resource at domain 173, web application server 172 determines that it does not have an active session for client 171, and it requests that authentication server 176 perform an appropriate authentication operation with client 171. Authentication server 176 communicates the result of the authentication operation to web application server 172. If the user (or browser 170 or client 171 on behalf of the user) is successfully authenticated, then web application server 172 establishes a session for client 171 and returns the requested protected resource. Typically, once the user is authenticated by the authentication server, a cookie may be set and stored in a cookie cache in the browser. FIG. 1D is merely an example of one manner in which the processing resources of a domain may be shared amongst multiple servers, particularly to perform authentication operations.

In a similar manner, after client 171 issues a request for a protected resource at domain 175, authentication server 177 performs an appropriate authentication operation with client 171, after which web application server 174 establishes a session for client 171 and returns the requested protected resource. Hence, FIG. 1D illustrates that client 171 may have multiple concurrent sessions in different domains yet is required to complete multiple authentication operations to establish those concurrent sessions.

Figure 1E:
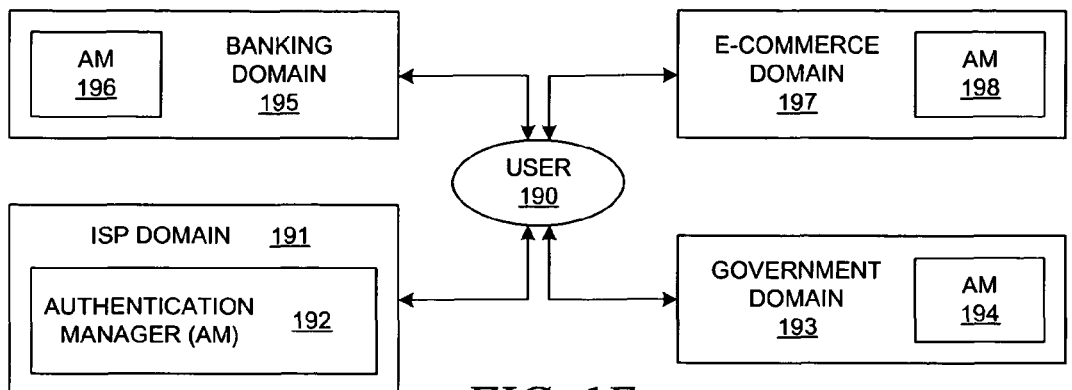
FIG. 1E depicts a block diagram that illustrates an example of a typical online transaction that might require multiple authentication operations from a user.

With reference now to FIG. 1E, a block diagram depicts an example of a typical online transaction that might require multiple authentication operations from a user. Referring again to FIG. 1C and FIG. 1D, a user may be required to complete an authentication operation prior to gaining access to a controlled resource, as shown in FIG. 1C. Although not shown in FIG. 1C, an authentication manager may be deployed on server 151 to retrieve and employ user information that is required to authenticate a user. As shown in FIG. 1D, a user may have multiple current sessions within different domains 173 and 175, and although they are not shown in FIG. 1D, each domain may employ an authentication manager in place of or in addition to the authentication servers. In a similar manner, FIG. 1E also depicts a set of domains, each of which support some type of authentication manager. FIG. 1E illustrates some of the difficulties that a user may experience when accessing multiple domains that require the user to complete an authentication operation for each domain.

User 190 may be registered at ISP domain 191, which may support authentication manager 192 that authenticates user 190 for the purpose of completing transactions with respect to domain 191. ISP domain 191 may be an Internet Service Provider (ISP) that provides Internet connection services, email services, and possibly other e-commerce services. Alternatively, ISP domain 191 may be an Internet portal that is frequently accessed by user 190.

Similarly, domains 193, 195, and 197 represent typical web service providers. Government domain 193 supports authentication manager 194 that authenticates users for completing various government-related transactions. Banking domain 195 supports authentication manager 196 that authenticates users for completing transactions with an online bank. E-commerce domain 197 supports authentication manager 198 that authenticates users for completing online purchases.

As noted previously, when a user attempts to move from one domain to another domain within the Internet or World Wide Web by accessing resources at the different domains, a user may be subjected to multiple user authentication requests or requirements, which can significantly slow the user's progress across a set of domains. Using FIG. 1E as an exemplary environment, user 190 may be involved in a complicated online transaction with e-commerce domain 197 in which the user is attempting to purchase an on-line service that is limited to users who are at least 18 years old and who have a valid driver license, a valid credit card, and a U.S. bank account. This online transaction may involve domains 191, 193, 195, and 197.

Typically, a user might not maintain an identity and/or attributes within each domain that participates in a typical online transaction. In this example, user 190 may have registered his or her identity with the user's ISP, but to complete the online transaction, the user might also be required to authenticate to domains 193, 195, and 197. If each of the domains does not maintain an identity for the user, then the user's online transaction may fail. Even if the user can be authenticated by each domain, then it is not guaranteed that the different domains can transfer information between themselves in order to complete the user's transaction. For user 190 shown in FIG. 1E, there is no prior art environment that allows user 190 to authenticate to a first web site, e.g., ISP 191, and then transfer an authentication token to other web service providers, such as domains 193, 195, and 197, for single-sign-on purposes.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, September/1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used within the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain.

Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Distinguishing Prior-Art Single-Sign-On Solutions

As noted above, prior-art single-sign-on solutions are limited to homogeneous environments in which there are pre-established business agreements between participating enterprises. These business agreements establish trust and define secure transfers of information between enterprises. These business agreements also include technological agreements on rules on how to translate, or map, user identities from one enterprise to another, and how to transfer the information used to vouch for users between participating enterprises.

In other words, previous single-sign-on solutions allow one enterprise to trust an authentication assertion (along with the identity of the user provided in the assertion) produced by a different enterprise based on the pre-negotiated or pre-configured agreements. Each distinct enterprise knows how to create and interpret authentication assertions that can be understood by other enterprises that have exchanged similar agreements, such as enterprises within an e-commerce marketplace. These homogeneous environments are tightly coupled because there is a deterministic relationship known by the enterprises for mapping the user identities across these systems. This tight coupling is possible because of the business agreements that are used to establish the single-sign-on environment.

Federation Model of Present Invention

In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

In contrast to prior-art systems, the present invention provides a federation model for allowing enterprises to provide a single-sign-on experience to a user. In other words, the present invention supports a federated, heterogeneous environment. As an example of an object of the present invention, referring again to FIG. 1E, user 190 is able to authenticate to domain 191 and then have domain 191 provide the appropriate assertions to each downstream domain that might be involved in a transaction. These downstream domains need to be able to understand and trust authentication assertions and/or other types of assertions, even though there are no pre-established assertion formats between domain 191 and these other downstream domains. In addition to recognizing the assertions, the downstream domains need to be able to translate the identity contained within an assertion to an identity that represents user 190 within a particular domain, even though there is no pre-established identity mapping relationship. It should be noted, though, that the present invention is applicable to various types of domains and is not limited to ISP-type domains that are represented within FIG. 1E as exemplary domains.

The present invention is directed to a federated environment. In general, an enterprise has its own user registry and maintains relationships with its own set of users. Each enterprise typically has its own means of authenticating these users. However, the federated scheme of the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the present invention, a federation is a set of distinct entities, such as enterprises, organizations, institutions, etc., that cooperate to provide a single-sign-on, ease-of-use experience to a user. In the present invention, a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationship with respect to the federation as a whole; the service provider does not need to manage authentication information, such as user password information, because it can rely on authentication that is accomplished by a user's authentication home domain.

The present invention also concerns a federated identity management system that establishes a foundation in which loosely coupled authentication, user enrollment, user profile management and/or authorization services, collaborate across security domains. Federated identity management allows services residing in disparate security domains to securely interoperate and collaborate even though there may be differences in the underlying security mechanisms and operating system platforms at these disparate domains. A single-sign-on experience is established once a user establishes their participation in a federation.

Home Domain, Issuing Party, and Relying Party

As explained in more detail further below, the present invention provides significant user benefits. The present invention allows a user to authenticate at a first entity, hereinbelow also referred to as the user's home domain or authentication home domain. This first entity may act as an issuing party, which issues an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user.

Figure 2A:
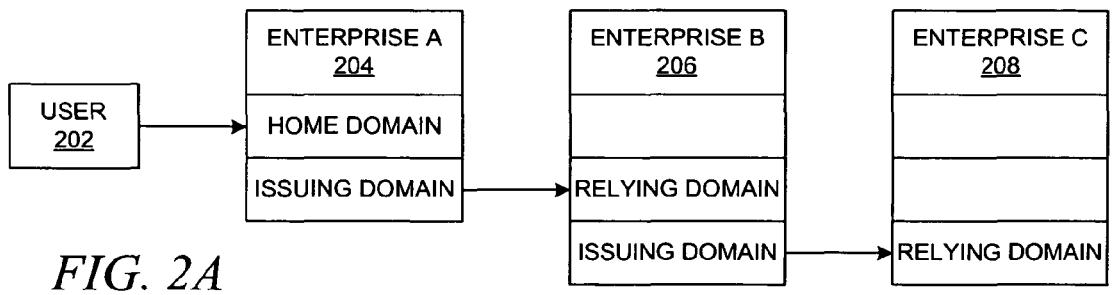
FIG. 2A depicts a block diagram that illustrates the terminology of the federated environment with respect to a transaction that is initiated by a user to a first federated enterprise, which, in response, invokes actions at downstream entities within the federated environment.

With reference now to FIG. 2A, a block diagram depicts the terminology of the federated environment with respect to a transaction that is initiated by a user to a first federated enterprise, which, in response, invokes actions at downstream entities within the federated environment. FIG. 2A shows that the terminology may differ depending on the perspective of an entity within the federation for a given federated operation. More specifically, FIG. 2A illustrates that the present invention supports the transitivity of trust and the transitivity of the authentication assertion process; a domain can issue an assertion based on its trust in an identity as asserted by another domain. User 202 initiates a transaction through a request for a protected resource at enterprise 204. If user 202 has been authenticated by enterprise 204, then enterprise 204 is the user's home domain for this federated session. Assuming that the transaction requires some type of operation by enterprise 206 and enterprise 204 transfers an assertion to enterprise 206, then enterprise 204 is the issuing domain with respect to the particular operation, and enterprise 206 is the relying domain for the operation. Assuming that the transaction requires further operations and enterprise 206 transfers an assertion to enterprise 208, then enterprise 206 is the issuing domain with respect to the requested operation, and enterprise 208 is the relying domain for the operation.

In the federated environment of the present invention, the domain at which the user authenticates is termed the user's (authentication) home domain. The home domain maintains authentication credentials. The home domain may be the user's employer, the user's ISP, or some other service provider. It is possible that there may be multiple enterprises within a federated environment that could act as a user's home domain because there may be multiple enterprises that have the ability to generate and validate a user's authentication credentials.

From an authentication perspective, an issuing party for an authentication assertion is usually the user's authentication home domain. The user's home domain may or may not maintain personal information or profile information for the user. Hence, from an attribute perspective involving personally identifiable information, personalization information, or other user attributes, an issuing party for an attribute assertion may or may not be the user's authentication home domain. To avoid any confusion, separate terminology can be employed for attribute home domains and authentication home domains, but the term "home domain" hereinbelow may be interpreted as referring to an authentication home domain.

Within the scope of a given federated session, however, there is usually one and only one domain that acts as the user's home domain. Once a user has authenticated to this domain, all other domains or enterprises in the federation are treated as relying parties for the duration of that session.

Given that the present invention provides a federated infrastructure that can be added to existing systems while minimizing the impact on an existing, non-federated architecture, authentication at a user's home domain is not necessarily altered by the fact that the home domain may also participate within a federated environment. In other words, even though the home domain may be integrated into a federated environment that is implemented in accordance with the present invention, the user should have the same end-user experience while performing an authentication operation at the user's home domain. It should be noted, though, that not all of a given enterprise's users will necessarily participate in the federated environment.

Moreover, user registration, e.g., establishment of a user account, is not necessarily altered by the fact that the home domain may also participate within a federated environment. For example, a user may still establish an account at a domain through a legacy or pre-existing registration process that is independent of a federated environment. In other words, the establishment of a user account at a home domain may or may not include the establishment of account information that is valid across a federation, e.g., via identity translation information. However, if there is a single federated domain that is able to authenticate a user, i.e. there is one and only one domain within the federation with whom the user has registered, then it would be expected that this domain would act as the user's home domain or identity provider in order to support the user's transactions throughout the federated environment.

If a user has multiple possible home domains within a federated environment, then a user may enter the federation via more than one entry point. In other words, the user may have accounts at multiple domains, and these domains do not necessarily have information about the other domains nor about a user's identity at the other domains.

While the domain at which the user authenticates is termed the home domain, the issuing domain is a federation entity that issues an assertion for use by another domain, i.e. the relying domain. An issuing domain is usually, but not necessarily, the user's home domain. Hence, it would usually be the case that the issuing party has authenticated the user through typical authentication protocols, as mentioned above. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any domain that has the ability to issue authentication assertions on behalf of a user can act as an issuing domain.

The relying domain is a domain that receives an assertion from an issuing party. The relying party is able to accept, trust, and understand an assertion that is issued by a third party on behalf of the user, i.e. the issuing domain. It is generally the relying party's duty to use an appropriate authentication authority to interpret an authentication assertion. In addition, it is possible that the relying party is able to authenticate a particular user, i.e. to act as a user's home domain, but it is also possible that a relying party may not be able to authenticate a particular user through conventional methods. Hence, a relying party is a domain or an enterprise that relies on the authentication assertion that is presented by a user and that provides a user with a single-sign-on experience instead of prompting the user for the user's authentication credentials as part of an interactive session with the user.

Federated Architecture—Federated Front-End for Legacy Systems

With reference now to FIG. 2B, a block diagram depicts the integration of pre-existing systems at a given domain with some of the federated architecture components of the present invention in accordance with an embodiment of the present invention. A federated environment includes federated entities that provide a variety of services for users. User 212 interacts with client device 214, which may support browser application 216 and various other client applications 218. User 212 is distinct from client device 214, browser 216, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 216 may be a typical browser, including those found on mobile devices, that comprises many modules, such as HTTP communication component 220 and markup language (ML) interpreter 222. Browser application 216 may also support plug-ins, such as web services client 224, and/or downloadable applets, which may or may not require a virtual machine runtime environment. Web services client 224 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 212 may access web-based services using browser application 216, but user 212 may also access web services through other web service clients on client device 214. Some of the examples of the present invention that are shown in the following figures employ HTTP redirection via the user's browser to exchange information between entities in a federated environment. However, it should be noted that the present invention may be conducted over a variety of communication protocols and is not meant to be limited to HTTP-based communications. For example, the entities in the federated environment may communicate directly when necessary; messages are not required to be redirected through the user's browser.

The present invention may be implemented in a manner such that components that are required for a federated environment can be integrated with pre-existing systems. FIG. 2B depicts one embodiment for implementing these components as a front-end to a pre-existing system. The pre-existing components at a federated domain can be considered as legacy applications or back-end processing components 230, which include authentication service runtime (ASR) servers 232 in a manner similar to that shown in FIG. 2C. ASR servers 232 are responsible for authenticating users when the domain controls access to application servers 234, which can be considered to generate, retrieve, or otherwise process protected resources. The domain may continue to use legacy user registration application 236 to register users for access to application servers 234. Information that is needed to authenticate a registered user is stored in legacy user registry 238.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federated front-end processing 240, which includes point-of-contact server 242 and trust proxy server 244 (or more simply, trust proxy 244, or equivalently, trust service) which itself includes Security Token Service (STS) 245, all of which are described in more detail below with respect to FIG. 2C. Federation configuration application 246 allows an administrative user to configure the federated front-end components to allow them to interface with the legacy back-end components through federated interface unit 248.

Legacy or pre-existing authentication services at a given enterprise may use various, well known, authentication methods or tokens, such as username/password or smart card token-based information. However, with the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federated front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy/trust service such that it appears as if the user was engaged in an authentication dialog.

Figure 2C:
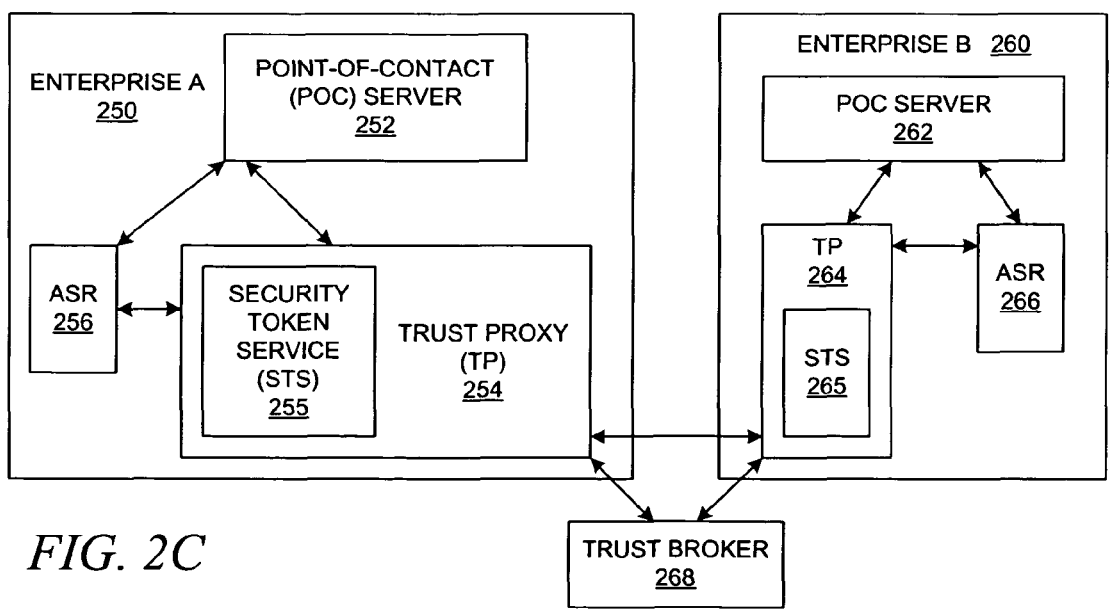
FIG. 2C depicts a block diagram that illustrates a federated architecture in accordance with an implementation of the present invention.

Federated Architecture—Point-of-Contact Servers, Trust Proxies, and Trust Brokers With reference now to FIG. 2C, a block diagram depicts a federated architecture in accordance with an implementation of the present invention. A federated environment includes federated enterprises or similar entities that provide a variety of services for users. A user, through an application on a client device, may attempt to access resources at various entities, such as enterprise 250. A point-of-contact server at each federated enterprise, such as point-of-contact (POC) server 252 at enterprise 250, is the user's entry point into the federated environment. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication assertion conversion. For example, the point-of-contact server may translate HTTP or HTTPS messages to SOAP and vice versa. As explained in more detail further below, the point-of-contact server may also be used to invoke a trust proxy/trust service to translate authentication assertions, e.g., a SAML token received from an issuing party can be translated into a Kerberos token understood by a receiving party.

A trust proxy, a trust proxy server, or a trust service, such as trust proxy (TP) 254 at enterprise 250, is able to establish and/or to maintain a trust relationship between two entities in a federation. A trust proxy generally has the ability to handle authentication token format translation (through the security token service, which is described in more detail further below) from a format used by the issuing party to one understood by the receiving party.

Together, the use of a point-of-contact server and a trust proxy minimize the impact of implementing a federated architecture on an existing, non-federated set of systems. Hence, the federated architecture of the present invention requires the implementation of at least one point-of-contact server and at least one trust proxy per federated entity, whether the entity is an enterprise, a domain, or other logical or physical entity. The federated architecture of the present invention, though, does not necessarily require any changes to the existing, non-federated set of systems. Preferably, there is a single trust proxy for a given federated entity, but there may be multiple trust proxies for availability purposes, or there may be multiple trust proxies for a variety of smaller entities within a federated entity, e.g., separate subsidiaries within an enterprise. It is possible that a given entity could belong to more than one federation, although this scenario would not necessarily require multiple trust proxies as a single trust proxy could manage trust relationships within multiple federations.

One role of a trust proxy/trust service may be to determine, or to be responsible for determining, the required token type for another domain and/or the trust proxy in that domain. A trust proxy has the ability or the responsibility to handle authentication token format translation from a format used by the issuing party to one understood by the receiving party. Trust proxy 254 is also responsible for any user identity translation or attribute translation that occurs for enterprise 250. In addition, a trust proxy can support the implementation of aliases as representatives of a user identity that uniquely identify a user without providing any addition information about the user's real world identity. Furthermore, a trust proxy can issue authorization and/or session credentials for use by the point-of-contact server. However, a trust proxy may invoke a trust broker for assistance, as described further below. Identity translation may be required to map a user's identity and attributes as known to an issuing party to one that is meaningful to a receiving party. This translation may be invoked by either a trust proxy at an issuing domain, a trust proxy at a receiving domain, or both.

Trust proxy 254 may include an internalized component, shown as security token service (STS) component 255, which will provide token translation and will invoke authentication service runtime (ASR) 256 to validate and generate tokens. The security token service provides the token issuance and validation services required by the trust proxy, which may include identity translation. The security token service therefore includes an interface to existing authentication service runtimes, or it incorporates authentication service runtimes into the service itself. Rather than being internalized within the trust proxy, the security token service component may also be implemented as a stand-alone component, e.g., to be invoked by the trust proxy, or it may be internalized within the transaction server, e.g., as part of an application server.

For example, an STS component may receive a request to issue a Kerberos token. As part of the authentication information of the user for whom the token is to be created, the request may contain a binary token containing a username and password. The STS component will validate the username and password against, e.g., an LDAP runtime (typical authentication) and will invoke a Kerberos KDC (Key Distribution Center) to generate a Kerberos ticket for this user. This token is returned to the trust proxy for use within the enterprise; however, this use may include externalizing the token for transfer to another domain in the federation.

In a manner similar to that described with respect to FIG. 1D, a user may desire to access resources at multiple enterprises within a federated environment, such as both enterprise 250 and enterprise 260. In a manner similar to that described above for enterprise 250, enterprise 260 comprises point-of-contact server 262, trust proxy 264, security token service 265, and authentication service runtime 266. Although the user may directly initiate separate transactions with each enterprise, the user may initiate a transaction with enterprise 250 which cascades throughout the federated environment. Enterprise 250 may require collaboration with multiple other enterprises within the federated environment, such as enterprise 260, to complete a particular transaction, even though the user may not have been aware of this necessity when the user initiated a transaction. Enterprise 260 becomes involved as a downstream domain, and the present invention allows enterprise 250 to present a federated assertion to enterprise 260 if necessary in order to further the user's transaction.

It may be the case that a trust proxy does not know how to interpret the authentication token that is received by an associated point-of-contact server and/or how to translate a given user identity and attributes. In this case, the trust proxy may choose to invoke functionality at a trust broker component, such as trust broker 268. A trust broker maintains relationships with individual trust proxies, thereby providing transitive trust between trust proxies. Using a trust broker allows each entity within a federated environment, such enterprises 250 and 260, to establish a trust relationship with the trust broker rather than establishing multiple individual trust relationships with each domain in the federated environment. For example, when enterprise 260 becomes involved as a downstream domain for a transaction initiated by a user at enterprise 250, trust proxy 254 at enterprise 250 can be assured that trust proxy 264 at enterprise 260 can understand an assertion from trust proxy 254 by invoking assistance at trust broker 268 if necessary. Although FIG. 2C depicts the federated environment with a single trust broker, a federated environment may have multiple trust brokers.

It should be noted that although FIG. 2C depicts point-of-contact server 252, trust proxy 254, security token service component 255, and authentication service runtime 256 as distinct entities, it is not necessary for these components to be implemented on separate devices. For example, it is possible for the functionality of these separate components to be implemented as applications on a single physical device or combined in a single application. In addition, FIG. 2C depicts a single point-of-contact server, a single trust proxy, and a single security token server for an enterprise, but an alternative configuration may include multiple point-of-contact servers, multiple trust proxies, and multiple security token servers for each enterprise. The point-of-contact server, the trust proxy, the security token service, and other federated entities may be implemented in various forms, such as software applications, objects, modules, software libraries, etc.

A trust proxy/STS may be capable of accepting and validating many different authentication credentials, including traditional credentials such as a username and password combinations and Kerberos tickets, and federated authentication token formats, including authentication tokens produced by a third party. A trust proxy/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust proxy/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust proxy/STS may internalize an authentication service, e.g., a scenario in which there is a brand-new installation of a web service that does not need to interact with an existing legacy infrastructure. Otherwise, the STS component will invoke external authentication services for validation of authentication tokens. For example, the STS component could "unpack" a binary token containing a username/password and then use an LDAP service to access a user registry to validate the presented credentials.

When used by another component such as an application server, the STS component can be used to produce tokens required for single-sign-on to legacy authentication systems. Hence, the STS component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the STS component to translate a Kerberos ticket (as used internally by the Web application server) to a an IBM RACF® passticket required by the CICS transaction gateway.

The entities that are shown in FIG. 2C can be explained using the terminology that was introduced above, e.g., "issuing party" and "relying party". As part of establishing and maintaining trust relationships, an issuing party's trust proxy/trust service can determine what token types are required/accepted by a relying party's trust proxy. Thus, trust proxies use this information when invoking token services from a security token service. When an issuing domain's trust proxy is required to produce an authentication assertion for a relying party, the trust proxy determines the required token type and requests the appropriate token from the security token service.

When a relying domain's trust proxy receives an authentication assertion from an issuing party, the trust proxy knows what type of assertion that it expected and what type of assertion that it needs for internal use within the relying domain. The relying domain's trust proxy therefore requests that the security token service generate the required internal-use token based on the token in the received authentication assertion.

Both trust proxies and trust brokers have the ability to translate an assertion received from an issuing party into a format that is understood by a relying party. The trust broker has the ability to interpret the assertion format (or formats) for each of the trust proxies with whom there is a direct trust relationship, thereby allowing the trust broker to provide assertion translation between an issuing party and a relying party. This translation can be requested by either party through its local trust proxy. Thus, the issuing party's trust proxy can request translation of an assertion before it is sent to the relying party. Likewise, the relying party's trust proxy can request translation of an assertion received from an issuing party.

Assertion translation comprises user identity translation, authentication assertion translation, attribute assertion translation, or other forms of assertion translation. Reiterating the point above, assertion translation is handled by the trust components within a federation, i.e. trust proxies and trust brokers. A trust proxy may perform the translation locally, either at the issuing domain or at the relying domain, or a trust proxy may invoke assistance from a trust broker.

Assuming that an issuing party and a relying party already have individual trust relationships with a trust broker, the trust broker can dynamically create, i.e. broker, new trust relationships between issuing parties and relying parties if necessary. After the initial trust relationship brokering operation that is provided by the trust broker, the issuing party and the relying party may directly maintain the relationship so that the trust broker need not be invoked for future translation requirements. It should be noted that translation of authentication tokens can happen at three possible places: the issuing party's trust proxy, the relying party's trust proxy, and the trust broker. Preferably, the issuing party's trust proxy generates an authentication assertion that is understood by the trust broker to send to the relying party. The relying party then requests a translation of this token from the trust broker into a format recognizable by the relying party. Token translation may occur before transmission, after transmission, or both before and after transmission of the authentication assertion.

Trust Relationships within Federated Architecture

Within a federated environment that is implemented in accordance with the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain.

Federation trust domains are those that cross enterprise boundaries; from one perspective, a federation trust domain may represent trust relationships between distinct enterprise trust domains. Federation trust domains are established through trust proxies across enterprise boundaries. Federated trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process is implemented out-of-band as this process also includes the establishment of business agreements that govern an enterprise's participation in a federation and the liabilities associated with this participation.

There are a number of possible mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the relying domain cannot depend upon the assertions received from the issuing domain; they cannot be used by the relying domain to determine how to interpret any information received from the issuing party.

For example, a large corporation may want to link several thousand global customers, and the corporation could use prior art solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

With the present invention, the enterprise will employ trust relationships established and maintained through trust proxies and possibly trust brokers. An advantage of the federated architecture of the present invention is that it does not impose additional requirements above and beyond the current infrastructures of an enterprise and its potential federation partners.

However, the present invention does not relieve an enterprise and its potential federation partners from the preliminary work required to establish business and liability agreements that are required for participation in the federation. In addition, the participants cannot ignore the technological bootstrapping of a trust relationship. The present invention allows this bootstrapping to be flexible, e.g., a first federation partner can issue a Kerberos ticket with certain information, while a second federation partner can issue a SAML authentication assertion with certain information.

In the present invention, the trust relationships are managed by the federation trust proxies, which may include a security token service that validates and translates a token that is received from an issuing party based on the pre-established relationship between two trust proxies. In situations where it is not feasible for a federated enterprise to establish trust relationships (and token translation) with another federated enterprise, a trust broker may be invoked. However, the federated enterprise must still establish a relationship with a trust broker.

With reference now to FIG. 2D, a block diagram depicts an exemplary set of trust relationships between federated domains using trust proxies and a trust broker in accordance with the present invention. Although FIG. 2C introduced the trust broker, FIG. 2D illustrates the importance of transitive trust relationships within the federated architecture of the present invention.

Federated domains 271-273 incorporate trust proxies 274-276, respectively. Trust proxy/trust service 274 has direct trust relationship 277 with trust proxy 275. Trust broker 280 has direct trust relationship 278 with trust proxy 275, and trust broker 280 has direct trust relationship 279 with trust proxy 276. Trust broker 280 is used to establish, on behalf of a federation participant, a trust relationship based on transitive trust with other federation partners. The principle of transitive trust allows trust proxy 275 and trust proxy 276 to have brokered trust relationship 281 via trust broker 280. Neither trust proxy 275 nor 276 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed by the present invention for specifying the details about the manner in which the trust relationships within a federation are implemented.

Assertion Processing within Federated Architecture

As noted above, a user's experience within a federation is governed in part by the assertions about the user or for the user that are transferred across domains. Assertions provide information about the user's authentication status, attribute information, and other information. Using authentication assertions can remove the need for a user to re-authenticate at every site that the user visits. Within a federated environment, there are two models to get an assertion from an issuing party to a relying party: push models and pull models. In a push model, the user's assertions travel with the user's request from the issuing party. In a pull model, the user's request is received at a relying party without some required information, and the relying party then requests the relevant or required assertions from the issuing party.

Figure 3A:
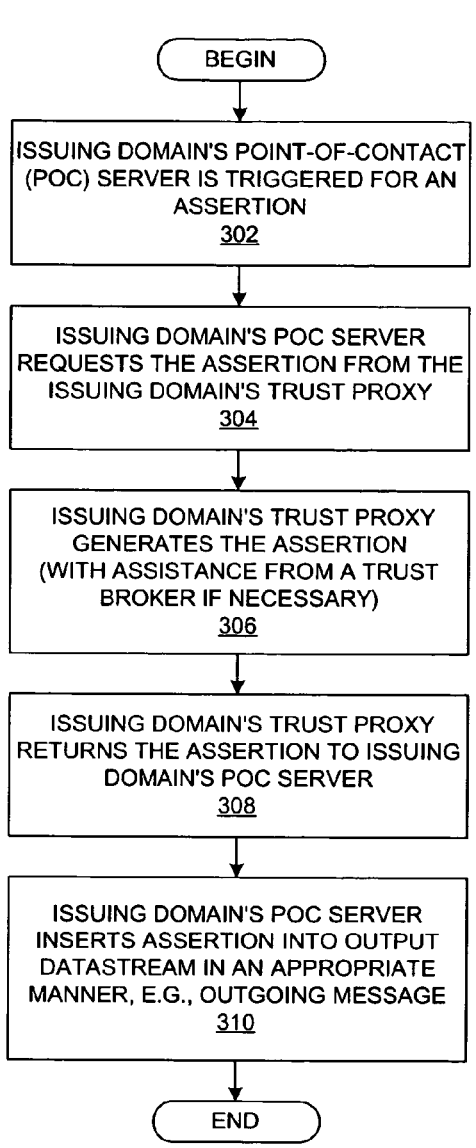
FIG. 3A depicts a flowchart that illustrates a generalized process at an issuing domain for creating an assertion within a federated environment.
Figure 3B:
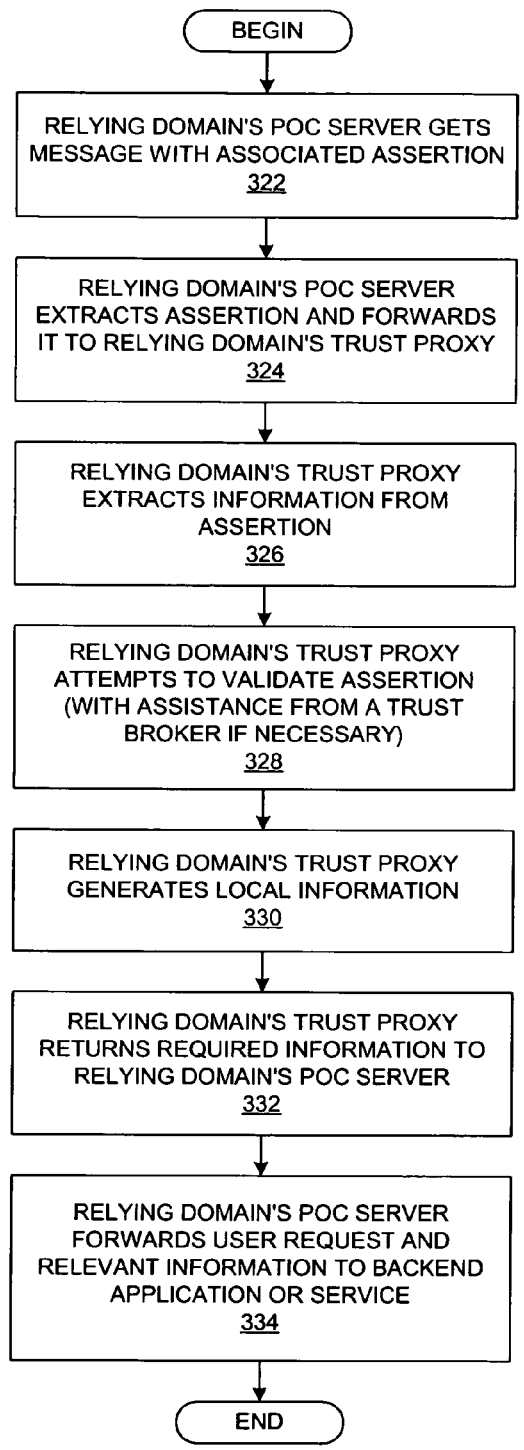
FIG. 3B depicts a flowchart that illustrates a generalized process at a relying domain for tearing down an assertion.
Figure 3C:
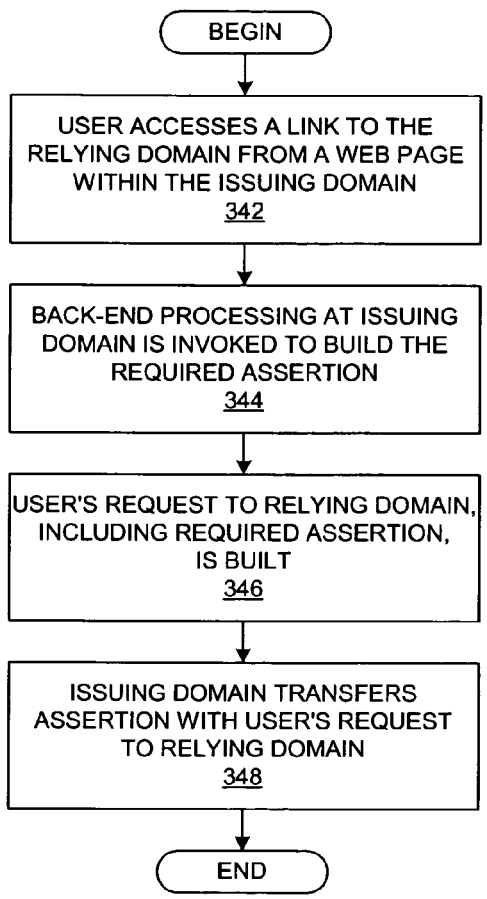
FIG. 3C depicts a flowchart that illustrates a specific process for pushing an assertion from an issuing domain to a relying domain in response to a user action at the issuing domain.
Figure 3D:
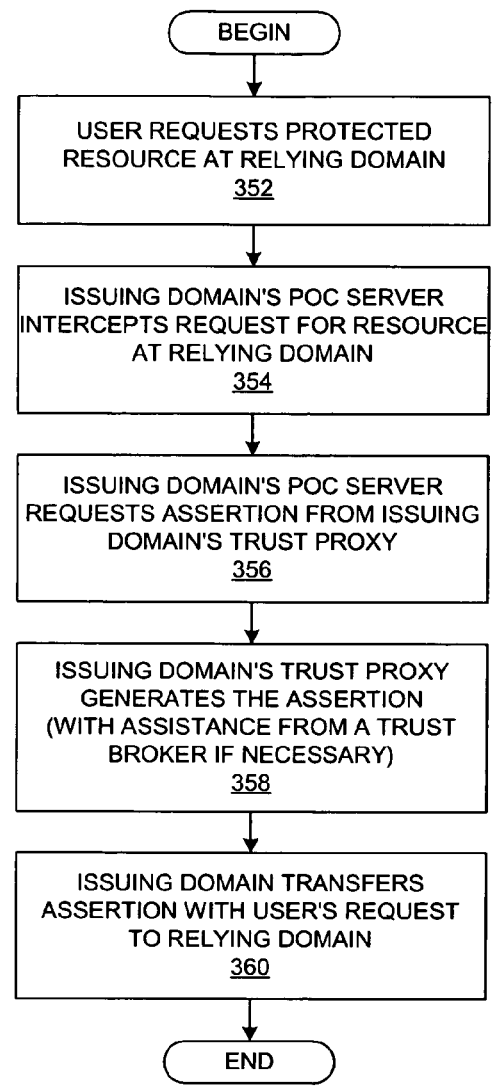
FIG. 3D depicts a flowchart that illustrates a specific process for pushing an assertion from an issuing domain to a relying domain in response to the issuing domain actively intercepting an outgoing request to the relying domain.
Figure 3E:
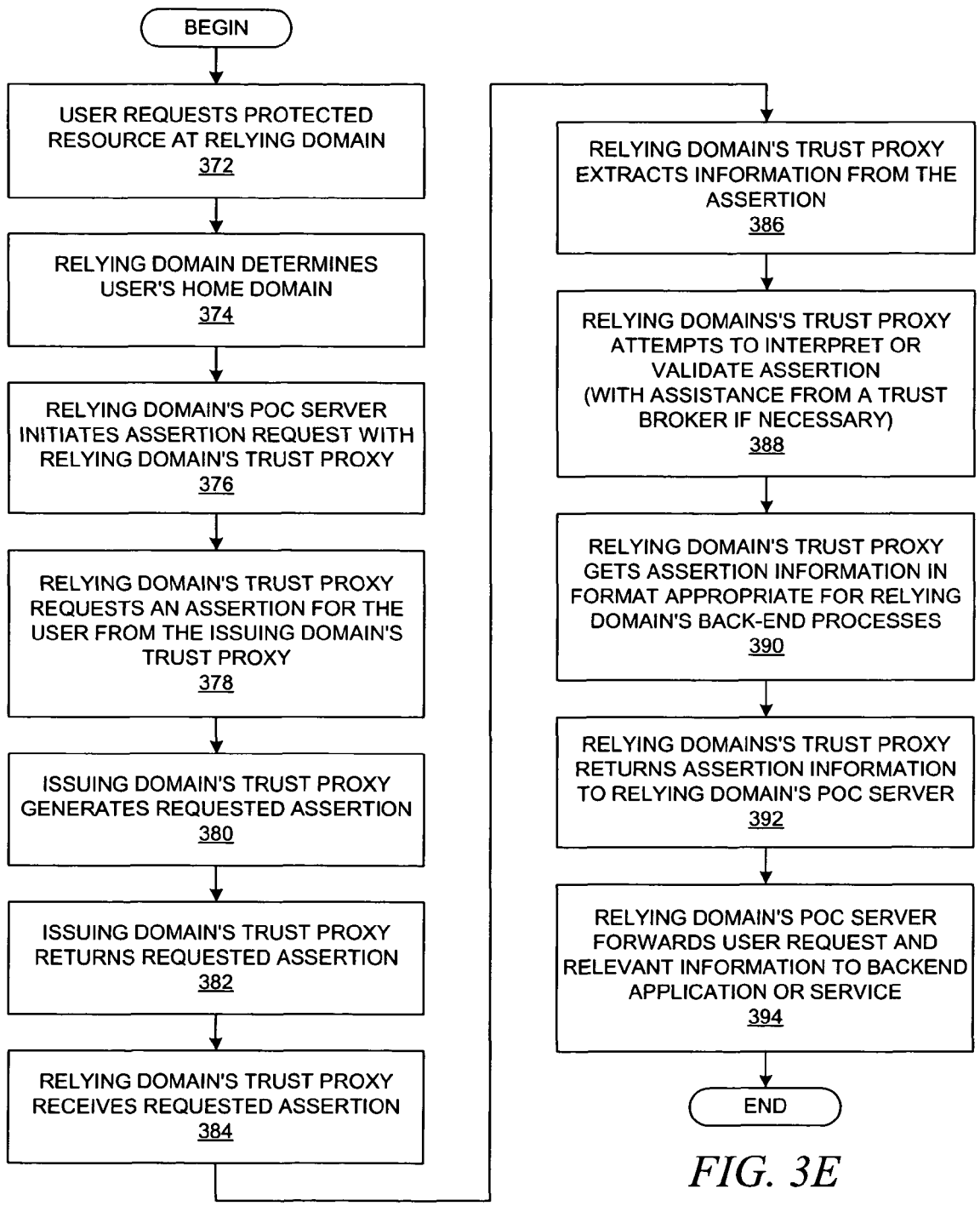
FIG. 3E depicts a flowchart that illustrates a pull model in which a relying domain requests any required assertions for a user from an issuing domain while attempting to satisfy a resource request that was received by the relying domain from the requesting user.

Given these models for using assertions within a federated environment, the description of the present invention now turns to a set of figures that describe a set of processes for creating and using assertions within the federated environment of the present invention. FIG. 3A depicts a generalized process at an issuing domain for creating an assertion within a federated environment, whereas FIG. 3B depicts a generalized process at a relying domain for "tearing down" an assertion, i.e. for reducing an assertion to its essential information by extracting and analyzing its information. FIG. 3C and FIG. 3D show more detailed processes for the generalized process that is shown in FIG. 3A by depicting two variants of a push model in which an assertion is produced within an issuing domain and is then transferred with a user's request to the relying domain. FIG. 3E depicts a pull model in which a relying domain requests any required assertions for a user from an issuing domain while attempting to satisfy a resource request that was received by the relying domain from the requesting user.

With reference now to FIG. 3A, a flowchart depicts a generalized process at an issuing domain for creating an assertion within a federated environment. The process begins when the issuing domain's point-of-contact server is triggered for an assertion (step 302). The point-of-contact server may receive a request for a particular assertion for a given user from a relying domain, or it may intercept an outgoing request to a known relying domain that requires an assertion; these scenarios are described in more detail below with respect to FIG. 3C and FIG. 3D, respectively. In response to being triggered for an assertion, the issuing domain's point-of-contact server requests the assertion from the issuing domain's trust proxy (step 304), which generates the assertion (step 306), along with adding trust information, such as encryption/signature of the assertion/token; the issuing domain's trust proxy may request assistance from a trust broker to generate the required assertion if necessary. After generating the assertion, the issuing domain's trust proxy then returns the assertion to the issuing domain's point-of-contact server (step 308), which then injects the assertion into the output datastream in an appropriate manner (step 310), e.g., by inserting the assertion into an outgoing HTTP or SOAP message, thereby completing the process.

FIG. 3A depicts a process for creating an assertion at an issuing domain without the use of a "local wallet". However, the present invention allows for the inclusion of local wallet functionality. In general, a local wallet is client-side code that may act as a secure datastore for user attribute information or other information for facilitating transactions; the client-side code may also participate in the push and/or pull models of assertion transfer. When the local wallet actively participates in the protocol, it implements a subset of the functionality of the point-of-contact server functionality in terms of generating and inserting assertions into the protocol flow. Using a local wallet does not allow for the local wallet to implement the trust-based interactions that occur between a point-of-contact server and the trust proxy. In cases in which additional trust relationships are required, the point-of-contact server must be invoked.

With reference now to FIG. 3B, a flowchart depicts a generalized process at a relying domain for tearing down an assertion. The process begins when a relying domain's point-of-contact server receives a message with an associated assertion (step 322), after which it extracts the assertion and forwards the assertion to the relying domain's trust proxy (step 324). The relying domain's trust proxy extracts information from the assertion, including the token received from the issuing domain (step 326); the relying domain's trust proxy will invoke the security token service to validate this token, including the information in the token and the trust information on the token such as encryption and signatures, thereafter returning a locally valid token for the user if appropriate (step 328).

As part of step 326, the trust proxy will determine the source, i.e. issuing party, of the assertion. If the trust proxy is able to understand a trust assertion received from this issuing domain, the trust proxy will perform step 328 internally. If the trust proxy is not able to understand/trust assertions received from the issuing domain, the trust proxy may invoke assistance from a trust broker. If the assertion cannot be validated, then an appropriate error response would be generated.

Assuming that the assertion is validated, then the relying domain's trust proxy builds the local information that is required for the user (step 330). For example, the local information may include authentication credentials that are required by a back-end legacy application. The relying domain's trust proxy returns the required information to the relying domain's point-of-contact server (step 332), which builds a local session for the user.

After the point-of-contact server builds a session for user, the user appears as an authenticated user. The point-of-contact server can use this session information to further govern any transactions the user has with the domain until a logout or timeout event is initiated. Given that the point-of-contact server has an authenticated identity for the user, the point-of-contact server may obtain authorization for this request if necessary based on this particular user's identity and any authorization policies that are associated with this particular user. The point-of-contact server then forwards the user's request with any relevant information to the requested back-end application or service (step 334), thereby completing the process.

It should be noted that the data items that are transferred between the point-of-contact server and the trust proxy and the format of those data items may vary. Rather than extracting an assertion from the message and forwarding only the assertion to the trust proxy, the point-of-contact server may forward the entire message to the trust proxy. For example, the processing at the trust proxy may include steps like signature validation on a SOAP message, which would require the entire SOAP envelope.

With reference now to FIG. 3C, a flowchart depicts a specific process for pushing an assertion from an issuing domain to a relying domain in response to a user action at the issuing domain. The process begins when a user accesses a link to the relying domain from a Web page or similar resource within the issuing domain (step 342), thereby invoking some form of CGI-type (Common Gateway Interface) processing to build a particular assertion. The ability of the issuing domain to recognize the need for an assertion by the relying domain implies a tight integration with an existing legacy system on which the federated infrastructure of the present invention is implemented. It also implies a tight coupling between the issuing party and relying party such that the issuing party does not need to invoke a trust proxy to build the required assertion; this tight coupling may be appropriate between certain types of federated entities that have well-established trust relationships.

Back-end processing at the issuing domain is invoked to build the required assertion (step 344), which may include invoking functionality at the local trust proxy. The user's request to the relying domain, including the required assertion, is then built (step 346), and the issuing domain transfers the assertion along with the user's request to the relying domain (step 348), thereby completing the process. When the relying domain receives the request and its associated assertion, then the relying domain would validate the assertion in the manner shown in FIG. 3B.

With reference now to FIG. 3D, a flowchart depicts a specific process for pushing an assertion from an issuing domain to a relying domain in response to the issuing domain actively intercepting an outgoing request to the relying domain. The process begins when a user requests a protected resource at the relying domain (step 352). The point-of-contact server intercepts the outgoing request (step 354), e.g., by filtering outgoing messages for predetermined Uniform Resource Identifiers (URI's), certain types of messages, certain types of message content, or in some other manner. The issuing domain's point-of-contact server then requests the generation of an appropriate assertion from the issuing domain's trust proxy (step 356), which generates the assertion with assistance from a trust broker if necessary (step 358). The issuing domain then transfers the user's request along with the generated assertion to the relying party (step 360), thereby completing the process. When the relying domain receives the request and its associated assertion, then the relying domain would validate the assertion in the manner shown in FIG. 3B.

With reference now to FIG. 3E, a flowchart depicts a pull model in which a relying domain requests any required assertions for a user from an issuing domain while attempting to satisfy a resource request that was received by the relying domain from the requesting user. The process begins when the relying domain receives a user request for a protected resource (step 372). In contrast to the examples shown in FIG. 3C or FIG. 3D, the example that is shown in FIG. 3E describes the processing that is associated with a user's request that is received at a relying domain in absence of any required assertions about a user. In this case, the issuing domain has not had the ability to intercept or otherwise process the user's request in order to insert the required assertions in the user's request. For example, the user might have entered a Uniform Resource Locator (URL) or used a bookmarked reference to a resource in such a way that the outgoing request was not intercepted by an issuing domain's point-of-contact server. Hence, the relying domain requests the assertion from an issuing domain.

The relying domain then determines the user's home domain (step 374), i.e. the relevant issuing domain. In an HTTP-based implementation, the user may have pre-established a relationship with the relying domain that resulted in a persistent cookie being set by the relying domain at the user's client device. The persistent cookie would contain an identity of the user's home domain, i.e. issuing domain. In a SOAP-based implementation in which the user is operating a web services client in some manner, the web service at the relying domain would have advertised the services requirements via WSDL (Web Services Description Language), including token requirements. This would then require the user's web services client/SOAP implementation to provide the required token type. If this requirement was not fulfilled, then the web service would technically return an error. In some cases, it may return an error code that would allow the user's web services client to be prompted for authentication information so that the request could be repeated with the appropriate token.

The relying domain's point-of-contact server initiates an assertion request with the relying domain's trust proxy (step 376), which requests an assertion for the user from the issuing domain's trust proxy (step 378). If the embodiment is employing HTTP-based communication, then an assertion request from the relying domain's trust proxy to the issuing domain's trust proxy may be transmitted by the relying domain's point-of-contact server via redirection through the user's browser application to the point-of-contact server at the issuing domain, which forwards the assertion request to the issuing domain's trust proxy.

If the embodiment is employing a SOAP-based implementation, then the relying party may return an error code to the user's web service client. This error code allows the user to be prompted for authentication information by their web services client. The web services client would then generate the requested token. The user's web services client could invoke a trust proxy directly provided that the relying domain's trust proxy was advertised in a UDDI (Universal Description, Discovery, and Integration) registry, allowing the user's web services client to find the trust proxy. In general, this scenario is valid only for an internal user, where the trust proxy was advertised in a private UDDI within the enterprise because it is not likely that a trust proxy will be advertised in a public UDDI on the Internet or generally accessible outside of a federation.

The issuing domain's trust proxy generates (step 380) and then returns the requested assertion (step 382) in a manner that mirrors the manner in which the assertion request was received. After the relying domain's trust proxy receives the requested assertion (step 384), then the relying domain's trust proxy extracts information from the assertion (step 386) and attempts to interpret and/or validate the assertion (step 388); the trust proxy may invoke assistance from a trust broker if necessary for translation of the assertion. If the assertion cannot be validated, then an appropriate error response would be generated. Assuming that the assertion is validated, then the relying domain's trust proxy builds the local information in an appropriate format that is required for use by the back-end services that will attempt to fulfill the user's request for the protected resource (step 390). For example, the local information may include authentication credentials that are required by a back-end legacy application. The relying domain's trust proxy returns the required information to the relying domain's point-of-contact server (step 392), which then builds a local session for the user and forwards the user's request with any relevant information to the requested back-end application or service (step 394), thereby completing the process.

Single-Sign-On within Federated Architecture

The description of FIGS. 2A-2D focuses on the operational characteristics of entities within a federated data processing environment in accordance with the present invention, whereas the description of FIGS. 3A-3E focuses on some of the processes that occur between those entities. In contrast to these descriptions, reference is made to FIG. 4 for a description of the present invention that focuses on the goals of completing transactions for a user while providing a single-sign-on experience for the user.

In other words, the description hereinbelow discusses the entities and processes that were already discussed above, although the following description focuses more on an overview perspective of the present invention with respect to the manner in which a user can have a single-sign-on experience within the user's session. A session can be defined as the set of transactions from (and including) the initial user authentication, i.e. logon, to logout. Within a session, a user's actions will be governed in part by the privileges granted to the user for that session. Within a federation, a user expects to have a single-sign-on experience in which the user completes a single authentication operation, and this authentication operation suffices for the duration of their session, regardless of the federation partners visited during that session.

During the user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

To facilitate a single-sign-on experience, web service that support the federated environment will also support using an authentication assertion or security token generated by a third-party to provide proof of authentication of a user. This assertion will contain some sort of evidence of the user's successful authentication to the issuing party together with an identifier for that user. Thus, a user may present traditional authentication credentials to one federation partner, e.g., username and password, and then provide a SAML authentication assertion that is generated by the authenticating/issuing party to a different federation partner.

Authentication in a web services environment is the act of verifying the claimed identity of the web services request so that the enterprise can restrict access to authorized clients. A user who requests or invokes a web service would almost always authenticated, so the need for authentication within the federated environment of the present invention is not any different from current requirements of web services for user authentication. The federated environment also allows web services or other applications to request web services, and these web services would also be authenticated.

Authentication of users that are not participating in a federated session are not impacted by the federated architecture of the present invention. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy component. The use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federated trust domain by recognizing an assertion that has been presented by the user as proof of authentication, such as an SAML authentication assertion, wherein the assertion has crossed between enterprise trust domains. The point-of-contact server may invoke the trust proxy, which in turn may invoke its security token service for validation of authentication credentials/security tokens.

Authentication of web services or other applications comprises the same process as authentication of users. Requests from web services carry a security token containing an authentication assertion, and this security token would be validated by the trust proxy/security token service in the same manner as a token presented by a user. A request from a web service should always carry this token with it because the web service would have discovered what authentication assertions/security tokens were required by the requested service as advertised in UDDI.

Figure 4:
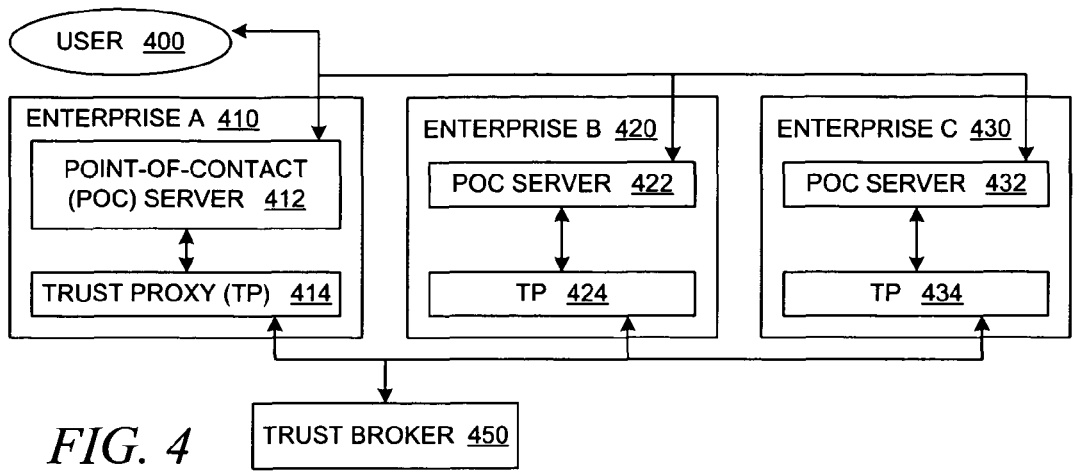
FIG. 4 depicts a block diagram that illustrates a federated environment that supports federated single-sign-on operations.

With reference now to FIG. 4, a block diagram depicts a federated environment that supports federated single-sign-on operations. User 400, through a client device and an appropriate client application, such as a browser, desires to access a web service that is provided by enterprise/domain 410, which supports data processing systems that act as a federated domain within a federated environment. Domain 410 supports point-of-contact server 412 and trust proxy 414; similarly, domain 420 supports point-of-contact server 422 and trust proxy 424, while domain 430 supports point-of-contact server 432 and trust proxy 434. The trust proxies rely upon trust broker 450 for assistance, as described above. Additional domains and trust proxies may participate in the federated environment. FIG. 4 describes a federated single-sign-on operation between domain 410 and domain 420; a similar operation may occur between domain 410 and domain 430.

The user completes an authentication operation with respect to domain 410; this authentication operation is handled by point-of-contact server 412. The authentication operation is triggered when the user requests access to some resource that requires an authenticated identity, e.g., for access control purposes or for personalization purposes. Point-of-contact server 412 may invoke a legacy authentication service, or it may invoke trust proxy 414 to validate the user's presented authentication credentials. Domain 410 becomes the user's home domain for the duration of the user's federated session.

At some later point in time, the user initiates a transaction at a federation partner, such as enterprise 420 that also supports a federated domain, thereby triggering a federated single-sign-on operation. For example, a user may initiate a new transaction at domain 420, or the user's original transaction may cascade into one or more additional transactions at other domains. As another example, the user may invoke a federated single-sign-on operation to a resource in domain 420 via point-of-contact server 412, e.g., by selecting a special link on a web page that is hosted within domain 410 or by requesting a portal page that is hosted within domain 410 but that displays resources hosted in domain 420. Point-of-contact server 412 sends a request to trust proxy 414 to generated a federation single-sign-on token for the user that is formatted to be understood or trusted by domain 420. Trust proxy 414 returns this token to point-of-contact server 412, which sends this token to point-of-contact server 422 in domain. Domain 410 acts as an issuing party for the user at domain 420, which acts as a relying party. The user's token would be transferred with the user's request to domain 420; this token may be sent using HTTP redirection via the user's browser, or it may be sent by invoking the request directly of point-of-contact server 422 (over HTTP or SOAP-over-HTTP) on behalf of the user identified in the token supplied by trust proxy 414.

Point-of-contact server 422 receives the request together with the federation single-sign-on token and invokes trust proxy 424. Trust proxy 424 receives the federation single-sign-on token, validates the token, and assuming that the token is valid and trusted, generates a locally valid token for the user. Trust proxy 424 returns the locally valid token to point-of-contact server 422, which establishes a session for the user within domain 420. If necessary, point-of-contact server 422 can initiate a federated single-sign-on at another federated partner.

Validation of the token at domain 420 is handled by the trust proxy 424, possibly with assistance from a security token service. Depending on the type of token presented by domain 410, the security token service may need to access a user registry at domain 420. For example, domain 420 may provide a binary security token containing the user's name and password to be validated against the user registry at domain 420. Hence, in this example, an enterprise simply validates the security token from a federated partner. The trust relationship between domains 410 and 420 ensures that domain 420 can understand and trust the security token presented by domain 410 on behalf of the user.

Federated single-sign-on requires not only the validation of the security token that is presented to a relying domain on behalf of the user but the determination of a locally valid user identifier at the relying domain based on information contained in the security token. One result of a direct trust relationship and the business agreements required to establish such a relationship is that at least one party, either the issuing domain or the relying domain or both, will know how to translate the information provided by the issuing domain into an identifier valid at the relying domain. In the brief example above, it was assumed that the issuing domain, i.e. domain 410, is able to provide the relying domain, i.e. domain 420, with a user identifier that is valid in domain 420. In that scenario, the relying domain did not need to invoke any identity mapping functionality. Trust proxy 424 at domain 420 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements. In the case of a direct trust relationship between two participants, the identifier translation algorithms will have been established for those two parties and may not be relevant for any other parties in the federation.

However, it is not always the case that the issuing domain will know how to map the user from a local identifier for domain 410 to a local identifier for domain 420. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 450. Identifier mapping rules and algorithms will have been established as part of this relationship, and the trust broker will use this information to assist in the identifier translation that is required for a brokered trust relationship.

Domain 420 receives the token that is issued by domain 410 at point-of-contract server 422, which invokes trust proxy 424 to validate the token and perform identity mapping. In this case, since trust proxy 424 is not able to map the user from a local identifier for domain 410 to a local identifier for domain 420, trust proxy 424 invokes trust broker 450, which validates the token and performs the identifier mapping. After obtaining the local identifier for the user, trust proxy 424, possibly through its security token service, can generate any local tokens that are required by the back-end applications at domain 420, e.g., a Kerberos token may be required to facilitate single-sign-on from the point-of-contact server to the application server. After obtaining a locally valid token, if required, the point-of-contact server is able to build a local session for the user. The point-of-contract server will also handle coarse-grained authorization of user requests and forward the authorized requests to the appropriate application servers within domain 420.

A user's session is terminated when they logout or sign-off. When a user logs out of a session with their home domain, then the home domain would notify all relying domains, i.e. those domains to which it has issued a security token, and invoke a user logout at these domains. If any of these relying domains has in turn acted as an issuing domain for the same user, then they would also notify all of their relying domains about the user logout request in a cascading fashion. The trust proxy at each domain would be responsible for notifying all relying domains of the user's logout request, and the trust proxy may invoke the trust broker as part of this process.

Federated Provisioning

A portion of the description of FIGS. 2A-4 above explained an organization of components that may be used in a federated environment while other portions explained the processes for supporting single-sign-on operations across the federated environment. Relying domains within a federated environment do not necessarily have to manage a user's authentication credentials, and those relying domains can leverage a single single-sign-on token that is provided by the user's issuing domain or home domain. Although federated provisioning can result in the establishment of a local, authenticatable account at a relying domain, the description of FIGS. 2A-4 above, does not explain an explicit federated provisioning process, e.g., a process in which identity information becomes configured at the federated domains of federated partners.

For example, the federated domains of the federated partners may have a need to maintain and manage a local account for the user that contains information that is specific to that user's profile within the federation partner. The need of an enterprise to maintain attributes locally would be driven by business and privacy concerns. In some cases, an enterprise may require that it manage attributes relevant to its services. In other cases, an enterprise may be legally prevented from allowing a third party to manage some information that must remain strictly within control of that enterprise.

In other words, in the description of the figures that was provided above, it was assumed that, given successfully executed authentication operations, each federated domain would recognize a properly asserted user identity during the single-sign-on operation. At some point in time, however, a federated domain would need to have been configured to bind some form of account linking or common unique user identity information to a user's identity, where this common unique user identity has also been bound to the user's local identity at some other federation partner. This common unique user identity allows two participants within a federation to uniquely refer to a user, for example, for the purposes of single-sign-on. The common unique user identity then allows each federation partner to maintain a local list of user attributes (which are used to determine to which resources a user will be granted access) without requiring the partners to share/manage these attributes for other partners.

It should be note that a common unique user identifier is often used when two partners have pre-existing accounts for same user. Thus, the user must invoke some form of explicit enrollment functionality. One advantage with a provisioning solution is that one of the partners can be relieved of the burden of having to create an authenticatable account by simply turning off authentication and allowing single-sign-on because the common unique user identifier is bound to the user at account creation time; in some cases, the common unique user identifier may become the user's local identifier at the partner.

At the high-level perspective, federated provisioning allows two distinct provisioning systems interact across trust domains. Within the context of a federated computing environment, federated provisioning comprises at least one of the following functionalities. A federated computing environment that supports federated provisioning may trigger the creation of a local account/user record at a federation partner such that the account is created in a linked fashion, i.e. that single-sign-on is immediately possible as the common unique user identifier is established as part of the account/record creation. The federated computing environment may also push updated user attributes to a user record at a federation partner. Additionally, the federated computing environment may pull/request updated user attributes for a user record from a federation partner. Furthermore, the federated computing environment may trigger the deletion of an account at a service provider partner such that the deletion operation deletes all information about the user at that partner. In addition, the federated computing environment may trigger the unlinking of accounts at a federation partner such that the user's common unique user identifier is deleted but the user's accounts/records are not, thereby resulting in the user having two distinct accounts, one at each partner. In all of the above-mentioned scenarios, a federated provisioning solution may also invoke a local workflow solution so that a local administrator still has control of users but does not need to trigger user account management. A process by which a user is provisioned at federated partners is described hereinbelow with respect to FIG. 7 and FIG. 8.

Figure 5:
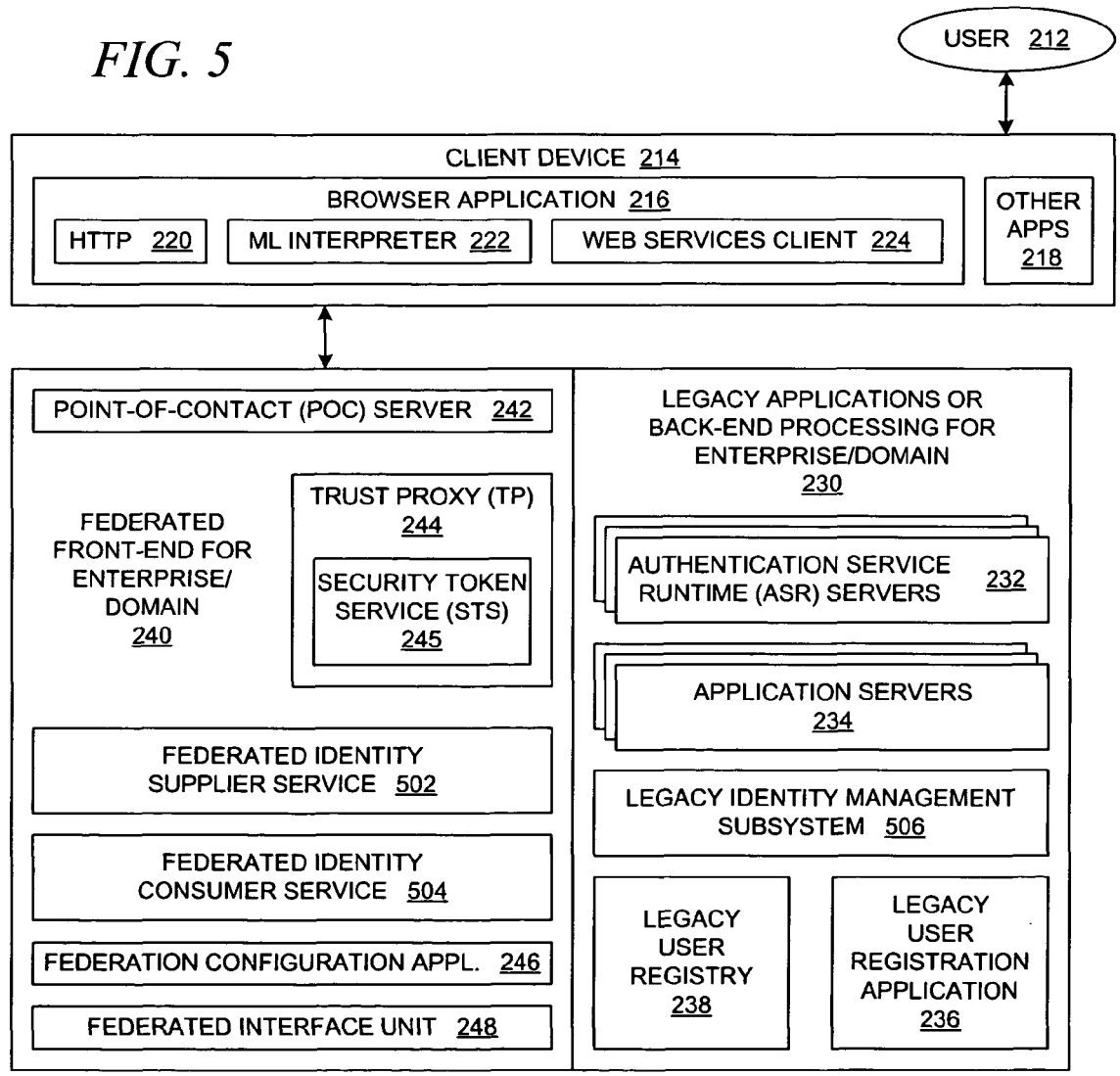
FIG. 5 depicts a block diagram that shows the integration of pre-existing systems at a given domain with federated architecture components of the present invention including federated provisioning services.

With reference now to FIG. 5, a block diagram depicts the integration of pre-existing systems at a given domain with federated architecture components of the present invention including federated provisioning services in accordance with an embodiment of the present invention. As noted above, a federated environment includes federated entities that provide a variety of services for users, and the present invention may be implemented in a manner such that components that are required for a federated environment can be integrated with pre-existing systems, as was described above with respect to FIG. 2B. The system that is shown in FIG. 5 is similar to the system that is shown FIG. 2B; similar reference numerals refer to similar elements. The federated components of a system at a federated domain act as a front-end to a pre-existing system, and the pre-existing components can be considered as legacy applications or back-end processing components.

However, the system that is shown in FIG. 5 has been extended to include services for supporting federated provisioning. It should be noted, though, that adding support for federated provisioning may be performed without any impact on the architecture that is used for supporting the features of single-sign-on; the common functionality between provisioning and single-sign-on is contained within the trust infrastructure as implemented by the trust proxy. Federated identity supplier service 502 and federated identity consumer service 504 support web service data flows between the federated domains of federated partners while interfacing to the local identity management systems, such as legacy identity management subsystem 506 that is shown as being included within back-end applications 230 for the domain. Federated identity supplier service 502 and federated identity consumer service 504, though, do not need to run through the point-of-contact server, or more importantly, through the same point-of-contact server as used for other federation operations, such as single-sign-on; for example, single-sign-on functionality can be HTTP-based, but a provisioning point-of-contact server could be web-services-based, e.g., a web services gateway/proxy. Federated identity supplier service 502 and federated identity consumer service 504 can be supported within the federated front-end as multiple independent services, as shown in FIG. 5, or alternatively, within a single federated component, as shown in FIG. 6.

Figure 6:
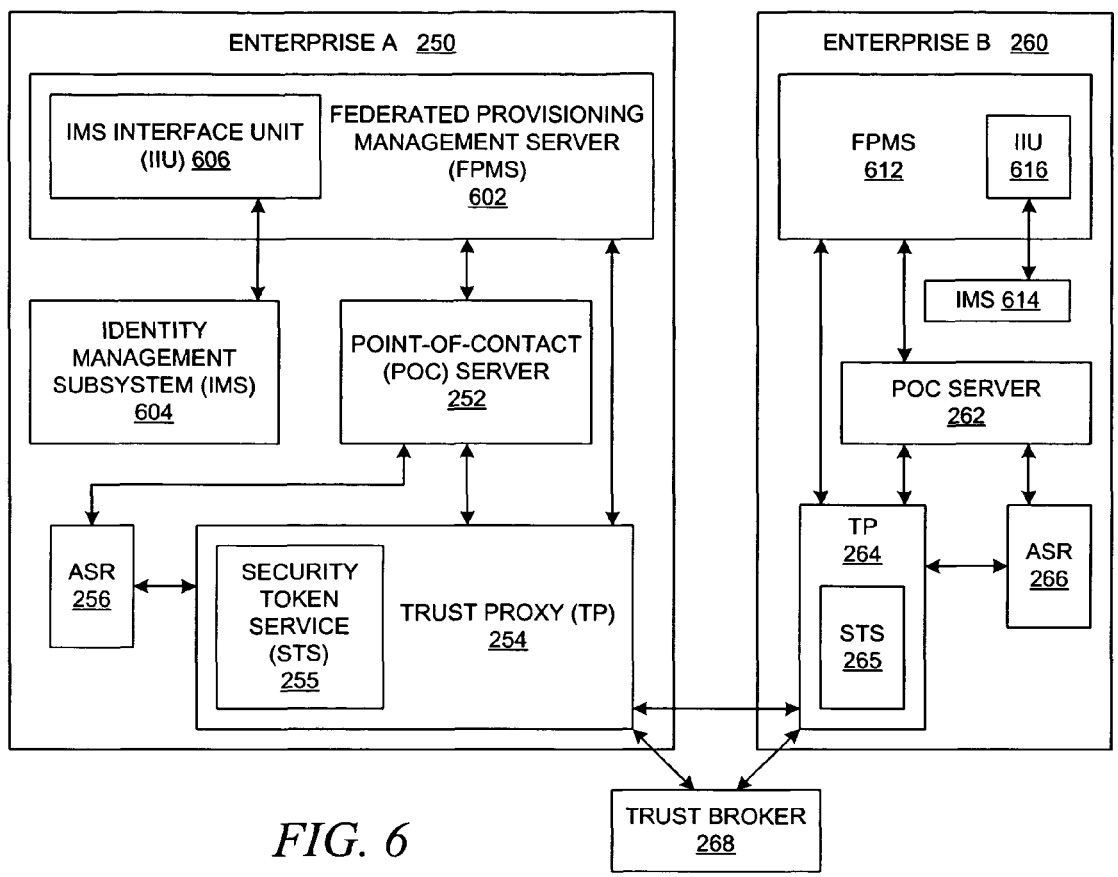
FIG. 6 depicts a block diagram that shows a federated architecture with support for federated provisioning in accordance with an implementation of the present invention.

With reference now to FIG. 6, a block diagram depicts a federated architecture with support for federated provisioning in accordance with an implementation of the present invention. The use of a point-of-contact server together with a trust proxy minimizes the impact of implementing a federated architecture on an existing, non-federated set of systems, as was described above with respect to FIG. 2C. The system that is shown in FIG. 6 is similar to the system that is shown FIG. 2C; similar reference numerals refer to similar elements. In an embodiment of the present invention, a point-of-contact server at each federated domain is the user's or requester's entry point into the federated environment, and the trust proxy manages the trust relationships of its associated federated domain. It should be noted, though, that single-sign-on is user-driven, e.g., a point-of-contact server allows a user to access controlled resources within a system, whereas provisioning functionality is typically application-based, e.g., applications typically trigger provisioning events, not users.

However, the system that is shown in FIG. 6 has been extended to include services for supporting federated provisioning in a manner similar to that described above with respect to FIG. 5. Hence, FIG. 6 merely provides a different logical perspective, or an example of a different embodiment, for including federated provisioning functionality within a federated domain. For example, federated provisioning management server (FPMS) 602 within federated enterprise 250 may include a distinct federated identity supplier service along with a distinct federated identity consumer service, which are not shown in FIG. 6. Federated provisioning management server 602 and/or its constituent services relies upon trust proxy 254 for trust relationship management, as necessary. Federated provisioning management server 602 processes data flows from point-of-contact server 252 for provisioning operations and provides hooks into a legacy or pre-existing identity management (i.e., provisioning) functionality, such as identity management subsystem or server (IMS) 604, via an interface, such as IMS interface unit (IIU) 606. Federated provisioning management server 602 processes data events with respect to the local provisioning/identity management system. Though incidental, the federated provisioning requests may flow through a web-services point-of-contact such that the web-services point-of-contact would provide security on any messages, but federated provisioning management server 602 provides the provisioning functionality.

By providing trust relationship management within a trust proxy in accordance with the present invention, the legacy or pre-existing identity management does not need to be modified while the federated enterprise interacts with other federated partners to support federated provisioning operations. It should be noted, though, that a federated provisioning management server does not possess trust relationships; the trust relationships would be managed by the web-services point-of-contact, e.g., web-services gateway or web-services proxy, etc.; in addition, a federated provisioning management server may be considered as a back-end resource. The use of a point-of-contact server allows the trust relationship management to be separated from the federated provisioning management server such that it does not need to contain functionality for the implementation of trust relationships.

Each domain within a federated environment would be expected to provide similar support for federated provisioning operations. For example, enterprise 260 likewise supports federated provisioning management server 612. Federated provisioning management server 612 and/or its constituent services have a trust relationship with trust proxy 264. Federated provisioning management server 612 processes data flows from point-of-contact server 262 with respect to provisioning operations and provides hooks into identity management subsystem or server 614, via an interface, such as IMS interface unit 616.

Figure 7:
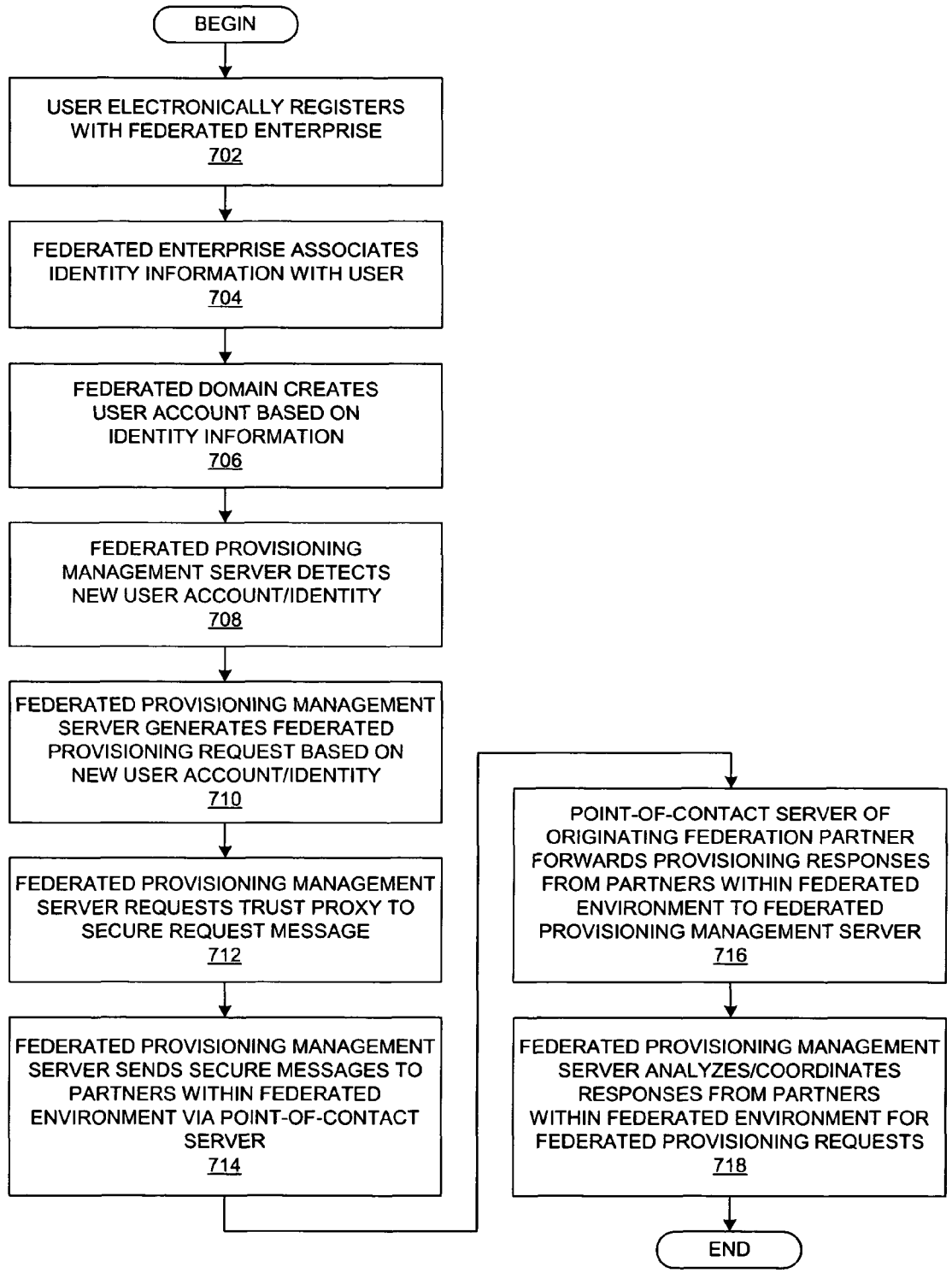
FIG. 7 depicts a flowchart that shows a process by which a user is provisioned from a federated enterprise to its federation partners in accordance with an embodiment of the present invention.

With reference now to FIG. 7, a flowchart depicts a process by which a user is provisioned from a federated enterprise to its federation partners in accordance with an embodiment of the present invention. The process begins when the user electronically registers with an enterprise in order to be provided access to controlled resources (step 702). The registration process may occur in a variety of different manners. For example, the user might complete a self-registration procedure on a web site through the Internet. In some cases, the user might register by paper form through the mail or by fax, after which an electronic registration procedure is completed by the enterprise. In other cases, the user's local account may be created in response to the actions of a local identity management system or through a middleware product.

In any case, the enterprise interacts with other enterprises within a federated environment, and the enterprise determines that the user should be provisioned to its federation partners. This determination may be performed as a result of the creation of a new user's local account, after which a local policy associated with these events causes the triggering of provisioning events to federation partners after the creation of a new user's local account. For example, in an employer/employee scenario, creation of a new employee record by a human resources administrative user may result in a federated provisioning management server triggering provisioning events to be sent to third-party benefits providers, such as health care providers. In a scenario with a service provider, the creation of a new user as a mobile subscriber of a telecom service may result in a federated provisioning management server triggering provisioning events to be sent to third-party service providers, e.g., an email service, based on attributes that are defined for the user and that are recognized by a federated provisioning management server.

The process continues when the federated enterprise associates identity information with the user (step 704), such as a unique identifier and/or other data. Various processes may be performed to obtain a user identifier; for example, the unique identifier may be chosen by the user during a self-registration operation, or the unique identifier may be generated by the federated enterprise.

The federated enterprise then creates a local user account based on the identity information that is associated with the user that is being registered (step 706), e.g., by creating the appropriate records within a user registry or other databases.

In an implementation of the present invention in which a federated enterprise relies on a legacy identity management subsystem for the creation of a user account or user profile, step 706 may be performed using an identity management subsystem such as IMS 604 that is shown in FIG. 6. This account may be authenticatable such that a user needs to present a username and password or similar credential for authentication purposes, but this account may also support sponsored, single-sign-on, type of account such that the user simply needs to present a single-sign-on assertion/token from an identity provider or home domain for authentication purposes.

It should be noted that in a case in which a federated enterprise relies on a legacy identity management subsystem for the creation of a user account or user profile, steps 702-706 may be implemented using a variety of well-known techniques for the registration of a user with respect to an enterprise. In other words, with respect to the present invention, steps 702-706 are not required to include any federation-specific processing in accordance with an embodiment of the present invention; the subsequent steps in the provisioning procedure that are described hereinbelow may represent the novel aspects of an embodiment of the present invention. For example, it should be noted that a federated provisioning operation may trigger a workflow-based process at a service provider in which the user account is created over many steps that cannot be isolated chronologically as including federated processing and non-federated processing.

The process continues when a federated provisioning management server or similar operational entity, such as FPMS 602 that is shown in FIG. 6, detects the new user account/profile or the activity for creating the new user account/profile (step 708). Detection may be based on monitoring a specific datastore to which a local provisioning system has been configured to locally provision a user based on policy; detection may also be accomplished by a direct trigger, e.g., from a local identity management subsystem that may be configured to attempt to directly issue a federated provisioning request that must then be caught and managed by the federated provisioning management server; another example of detection of user registration events is described further below. After the federated provisioning management server detects one or more of these events, the federated provisioning management server initiates the provisioning of the user to other federated domains within the federated environment using the steps that are described hereinbelow. A federated provisioning management server does not actually provision to other systems; it provides a means of taking a provisioning request and bundling it in a secure manner for vendor/ML neutral transmission over the Internet. When receiving one of these requests, a federated provisioning management server is responsible for unpacking the request, doing markup language translation, applying security policy, and using information to trigger local provisioning, e.g., by directly invoking a local identity management system or by creating a new record in a datastore that is monitored by the identity management system.

Continuing with the process in FIG. 7, the federated provisioning management server generates a federated provisioning request that is based on the new user identity and/or other user-specific information (step 710); the federated provisioning request is a message body or other data item that contains the user-registration information to be transmitted to other federated partners. It should be noted, though, that provisioning entails many types of operations, such as account creation, account deletion, attribute update (write, update, delete), and other types of operations, so a federated provisioning request message may be directed to any other these operations. The federated provisioning management server requests that the local trust proxy within the federated enterprise build a security token that accompanies the federated provisioning request (step 712). It should be noted that any of the described processing steps may include many steps; for example, the federated provisioning management server may perform a series of operations, including functionality over web-application services (WAS), thereby causing the invocation of WAS security handlers that subsequently invoke the trust proxy to validate the tokens associated with the incoming request. The federated provisioning management server includes the functionality of packing/unpacking the provisioning request/response itself, which is independent of packing/unpacking the security on the request/response. The trust proxy may encrypt information, generate security tokens, perform authorization decisions, or perform other security-related operations that are necessary to ensure that federated partners that receive the federated provisioning message can trust the contents of the received message based on the trust relationships that have been established between the federated partners and that are managed by the local trust proxy in conjunction with trust proxies at the federated partners. The manner in which the federated provisioning message is built may depend on the identity of the targeted/destination federated domain and the requirements of the secure messages that are expected by the trust proxy at the destination federated domain. The identities of the federation partners to which the newly registered user should be provisioned may be determined by reference to a local database or other source of information that is used to manage the relationships between the federated enterprise and its federated partners. The federated provisioning management server subsequently sends the federated provisioning message along with a security token to one or more federated domains using the local point-of-contact server within the federated enterprise (step 714).

At some subsequent point in time, the point-of-contact server of the source/originating federation partner forwards to the federated provisioning management server any responses that have been received from partners within the federated environment for the previously transmitted federated provisioning request (step 716). The federated provisioning management server then analyzes and manages the received responses (step 718), thereby concluding the process. For example, it may be assumed that the federated provisioning requests and responses are processed in an asynchronous manner, and the federated provisioning management server tracks whether each targeted/destination federated partner responds to a previously transmitted federated provisioning request in a timely manner. In addition, the federated provisioning management server responds to various error conditions that may occur, such as error status that may be received from a targeted/destination federation partner.

Figure 8:
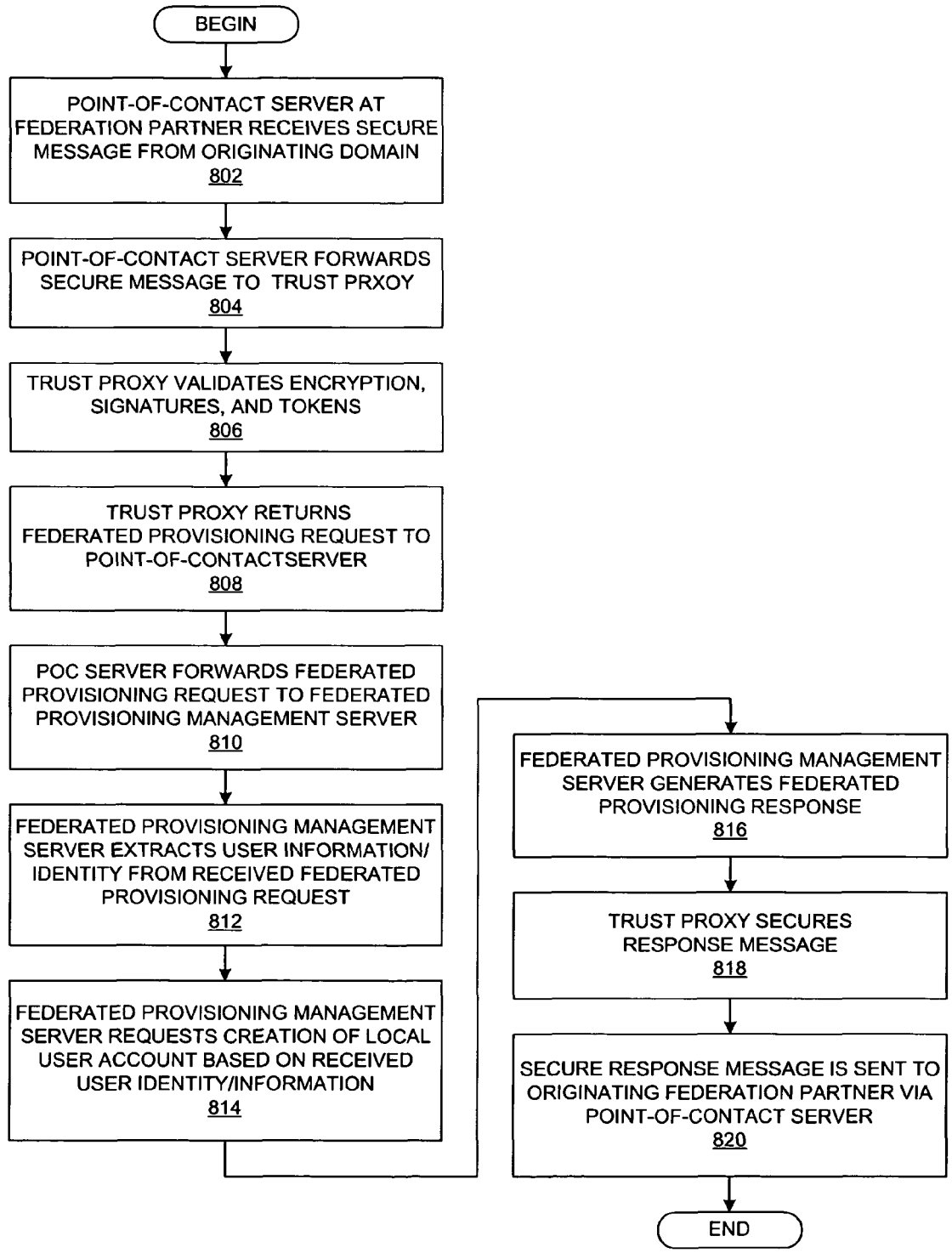
FIG. 8 depicts a flowchart that shows a process by which a user is provisioned at a federated enterprise at the direction of a federation partner in accordance with an embodiment of the present invention.

With reference now to FIG. 8, a flowchart depicts a process by which a user is provisioned at a federated enterprise at the direction of a federation partner in accordance with an embodiment of the present invention. Whereas the process that is described with respect to FIG. 7 involves the source/originating federated domain for a federated provisioning request, the process that is described with respect to FIG. 8 involves the target/destination federated domain that processes a federated provisioning request that has been received from the source/originating federated domain. For example, referring to FIG. 6, enterprise domain 250 may act as a home domain for a newly registered user, and domain 250 provisions the user to domain 260 via communications between point-of-contact server 252 and point-of-contact server 262, respectively.

Referring to FIG. 8, the process commences with a point-of-contact server at a federation partner receiving a federated provisioning message and accompanying security token from the source/originating federated domain (step 802), after which the point-of-contact server forwards the message, most likely a copy of the message, to the trust proxy (step 804), which may then validate encryption on the message, signatures on the message, and tokens (step 806). Alternatively, the point-of-contact server may not forward the entire message; the point-of-contact may build a specific trust request that sends only the necessary information to the trust server and not the entire request. In another alternative, the federation partner may leverage WAS-based functionality for message-level encryption and signing. It should also be noted that the federation partner may optionally perform an authorization decision that is based on the user/application that is attempting to do the provisioning.

The trust proxy returns the federated provisioning request to the point-of-contact server (step 808), which then forwards the request to the federated provisioning management server (step 810); alternatively, the trust proxy returns the result of the trust processing. The federated provisioning management server extracts from the federated provisioning request the user identity and/or other user-specific information about the user that has been newly registered at the source/originating federated domain (step 812).

The federated provisioning management server then initiates the creation of a local user account within the target/destination domain based on the extracted identity information for the user (step 814), e.g., by creating the appropriate records within a user registry or other databases or by initiating an appropriate workflow-based approval process, which would allow a service provider to implement their own approval process/policy with the creation of a user account, even if triggered by a federated partner, such as an identity provider. In an implementation of the present invention in which the target/destination domain relies on a legacy identity management subsystem for the creation of a user account or user profile, step 814 may be performed using an identity management subsystem such as IMS 614 that is shown in FIG. 6, e.g., by having the federated provisioning management server send a triggering event directly to an identity management subsystem. The federated provisioning management server generates a federated provisioning response that indicates the success or the failure of the processing of the received federated provisioning request (step 816) and requests that the local trust proxy secure the response message that contains the federated provisioning response (step 818); alternatively, the point-of-contact server requests that the trust proxy perform security operations on the message. The secure message that contains the federated provisioning response is then sent to the source/originating domain using the local point-of-contact server within the federated enterprise (step 820), and the process is concluded. In an alternative embodiment, a preliminary acknowledgment is returned to the source/originating domain at some point after the request has been received and/or verified; the status for the overall provisioning operation can then be returned at some later point in time, thereby allowing for the accommodation of asynchronous environments.

It should be noted that the example that is shown in FIG. 7 and FIG. 8 describes a process by which a user account is created at a federation partner during a provisioning operation. However, a provisioning operation may be performed to update information or to delete information. For example, an identity provider may update a user's attributes locally, thus triggering provisioning of these updated attributes to a partner; these updated attributes might then be used to change the user's privileges at the federation partner.

Figure 9:
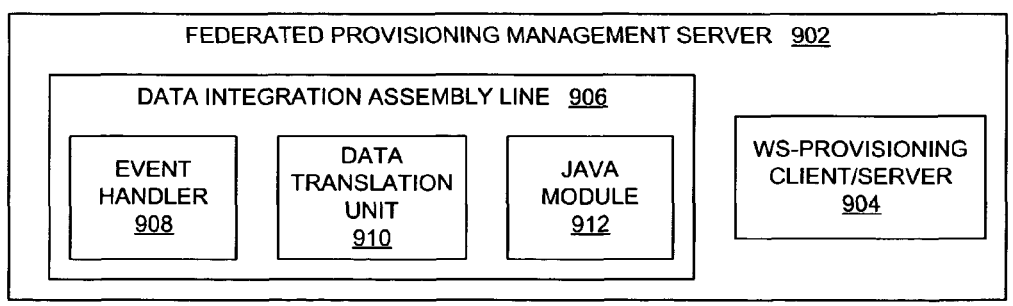
FIG. 9 depicts a block diagram that shows further detail for a federated provisioning management server that includes support for WS-Provisioning functionality in accordance with an embodiment of the present invention.

With reference now to FIG. 9, a block diagram depicts further detail for a federated provisioning management server that includes support for WS-Provisioning functionality in accordance with an embodiment of the present invention. In a manner similar to that discussed above with respect to FIG. 5 and FIG. 6, federated provisioning management server 902 comprises support for a federated identity supplying service and a federated identity consumer service such that a newly registered user can be provisioned to federated partners. In the example that is shown in FIG. 9, the federated provisioning functionality includes a web services provisioning client and server, which is shown in FIG. 9 as WS-Provisioning client/server 904 that supports the WS-Provisioning specifications, although other provisioning standards may additionally or alternatively be supported; the direction of the data flow during the processing of a federated provisioning requests determines whether WS-Provisioning client/server 904 is acting as a client or as a server. In other words, federated provisioning management server 902 may be embedded within a source/originating domain or within a target/destination domain; the WS-Provisioning client acts with the identity providing service, and the WS-Provisioning server acts with the identity consuming service. WS-Provisioning client/server 904 could be invoked directly from an identity management subsystem if there is tight integration between the identity management subsystem and the federated functionality; for example, the identity management subsystem may have a web service interface that enables it to directly invoke the WS-Provisioning client. Otherwise, if the federated functionality is supported as a federated front-end to minimize the impact on legacy applications, e.g., as shown in FIG. 5, then WS-Provisioning client/server 904 can be invoked as an output unit from data integration assembly line 906, where data integration assembly line 906 in turn acts as an endpoint for events from the identity management subsystem.

Data integration assembly line 906 may be implemented with a commercially available product, such as IBM™ Directory Integrator (IDI) product. Data integration assembly line 906 comprises event handler 908, data translation unit 910, and Java™ module 912. The use of a data integration assembly line supports federated provisioning in non-provisioning engine scenarios, e.g., when a user account/profile is created within an LDAP as a result of a self-registration process. In such cases, there is no provisioning engine that is able to intercept the creation of new records in user registries, directories, or other databases that allows for the initiation of a federated provisioning operation. The use of a data integration assembly line is customizable for the different deployment requirements of a given enterprise. For example, the use of a data integration assembly line also supports cross-vendor implementations by allowing sending/receiving of information even in cases in which one vendor uses one type of markup language and the other uses a different type of markup language.

Event handler 908 is the input connector within the data integration assembly line. Event handler 908 is able to listen for event notifications from various sources, such as the creation of records for newly registered users within various types of datastores, such as LDAP, etc., and then extract that information from the data source. If additional information is required to generate a federated provisioning request, e.g., such as information about the source/originating domain, then the data integration assembly line can be customized to retrieve additional information; in other words, the user-specific identity information is not necessarily the only input data for the federated provisioning operation.

Data translation unit 910 formats the extracted data into the appropriate data format, e.g., a directory service markup language (DSML) data item or a SPML (service provisioning markup language) data item, if necessary. If the source/originating domain and the target/destination domain are known to employ the same data format for their identity information, then an intermediate data format may not be necessary.

Assuming that WS-Provisioning client/server 904 is implemented as a J2EE™ application or other Java™, e.g., a WS-Provisioning client with a WS-Provisioning proxy/stub, Java™ module 912 is responsible for invoking the WS-Provisioning client. The WS-Provisioning client builds a WS-Provisioning request that is sent to the target/destination domain. The WS-Provisioning client would be responsible for the eventual invocation of the trust proxy; the client can (a) build the proper web services request and (b) use a web services server as a point-of-contact entity, wherein the web services server acts as a point-of-contact that invokes the trust proxy. The trust proxy may also be implemented to support web services, particular in accordance with the WS-Security and WS-Trust specifications, whereby a secure web services request can be generated.

In an alternative embodiment, the data integration assembly line may include support for web services, which would provide it with the ability to invoke web services directly. In this embodiment, the web services client/server would not need to be explicitly included; since one use of the client/server is to ensure that a point-of-contact entity has the appropriate hooks into the security processing functionality, the data integration assembly line in this alternative embodiment would include hooks for security/trust processing.

The description of FIG. 9 heretofore has focused on the functionality at the source/originating domain wherein the WS-Provisioning client builds a WS-Provisioning request that is sent to the target/destination domain's WS-Provisioning server. However, a similar pattern of activity occurs somewhat in reverse at the target/destination domain after receiving the WS-Provisioning request from the source/originating domain. The WS-Provisioning server extracts the user identity and/or other user-specific information and invokes a data integration assembly line, which then performs any necessary data translations and provisions the user information to the required endpoint, e.g., a user registry database or an LDAP directory; alternatively, the data integration assembly line inputs data directly into an identity management subsystem. In this manner, the WS-Provisioning client/server provides web service functionality that can be used to provision user information and/or service subscription information.

CONCLUSION

The advantages of the present invention should be apparent in view of the detailed description of the invention that is provided above. Among the advantages of the present invention, the trust proxies allow the pre-existing security services in a given domain to establish trust relationships with other domains without having to subscribe to the same trust root or use the same trust-establishment technology. Hence, the federated architecture of the present invention provides a loose coupling of entities. Federations allow users to seamlessly traverse different sites within a given federation in a single-sign-on fashion. Federated provisioning allows multiple federated domains to prepare to provide access to resources to users that have established other domains as a home domain.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A data processing system comprising:
a point-of-contact server, wherein the point-of-contact server receives incoming requests for access to resources identifiable within a domain, wherein the domain is associated with a plurality of domains within a federated computing environment;
a trust proxy, wherein the trust proxy generates one or more authentication assertions and/or attribute assertions sent from the domain and validates one or more authentication assertions and/or attribute assertions received at the domain; and
an application server that interfaces with the point-of-contact server and the trust proxy, in response to provisioning a user at the domain, for initiating provisioning of the user in at least one other domain in the plurality of domains within the federated computing environment by sending a provisioning request;
the provisioning request associated with a provisioning operation being one of: creation of a user record, pushing updated user attributes to a user record, pulling updated user attributes for a user record, deletion of a user account, and unlinking of one or more user accounts.

2. The data processing system of claim 1 wherein the point-of-contact server further comprises:
computer program instructions that, when executed by a processor, invoke the application server to process federated provisioning requests.

3. The data processing system of claim 1 wherein the application server further comprises:
computer program instructions that, when executed by a processor, invoke the trust proxy to generate a security token to be associated with a federated provisioning request or a federated provisioning response to demonstrate a trust relationship between a requester and a responder.

4. The data processing system of claim 1 wherein the point-of-contact server and the trust proxy perform front-end processing for functionality associated with the federated computing environment while interfacing with at least one back-end application.

5. The data processing system of claim 4 wherein the application server further comprises:
computer program instructions that, when executed by a processor, interfaces with an identity management subsystem as a back-end application.

6. The data processing system of claim 1 wherein the point-of-contact server further comprises:
computer program instructions that, when executed by a processor, associates an assertion with an outgoing request from the point-of-contact server to a different domain within the federated computing environment.

7. The data processing system of claim 1 wherein the trust proxy further comprises:
computer program instructions that, when executed by a processor, maintains trust relationships with different domains within the federated computing environment.

8. The data processing system of claim 1 wherein the trust proxy further comprises:
computer program instructions that, when executed by a processor, interoperates with a trust broker to obtain assistance in translating an assertion that has been received from a different domain within the federated computing environment.

9. The data processing system of claim 1 wherein the application server supports at least one web service.

10. The data processing system of claim 9 wherein a web service is supported in accordance with web-services-based provisioning standard as exemplified by the WS-Provisioning standard.

11. The data processing system of claim 1 wherein the application server initiates provisioning of the user in at least one other domain in an automated manner in response to provisioning a user at the domain.

12. The data processing system of claim 1 wherein the provisioning operation is initiated in an automated manner in response to provisioning of the user within the domain.

13. A machine-implemented method for providing federated functionality within a data processing system, the method comprising:
receiving an incoming request at a point-of-contact server to provision a user within a domain, wherein the domain is associated with a plurality of domains within a federated computing environment;
validating at a trust proxy one or more security assertions received at the domain through the point-of-contact server;
responsive to provisioning the user within the domain, initiating a provisioning operation in at least one other domain in the plurality of domains within the federated computing environment by sending a provisioning request;
the provisioning request associated with a provisioning operation being one of: creation of a user record at the other domain, pushing updated user attributes to a user record at the other domain, pulling updated user attributes for a user record, deletion of a user account, and unlinking of one or more user accounts.

14. The method of claim 13 where security assertions are distinct from the user-specific information contained in the provisioning request.

15. The method of claim 13 wherein the trust proxy is able to apply an authorization decision to the incoming request.

16. The method of claim 13 wherein the incoming request is interpreted as initiating a request for user-specific information and/or attributes about the user from the domain.

17. The method of claim 13 further comprising:
   extracting user-specific information that is associated with the user from the provisioning request;
   performing the provisioning operation by invoking an identity management application within the domain;
   creating, modifying, or deleting one or more user-specific entries in one or more datastores for the user by the identity management application.

18. The method of claim 13 further comprising:
   extracting user-specific information that is associated with the user from the provisioning request;
   creating, modifying, or deleting one or more user-specific entries in one or more datastores for the user;
   detecting the user-specific activity within the domain by the identity management application; and
   provisioning the user within the domain such that the user subsequently has access to controlled resources within the domain.

19. A computer program product on a non-transitory computer readable medium for use in a data processing system for providing federated functionality within the data processing system, the computer program product holding computer program instructions which when executed by the data processing system perform a method comprising:
   receiving an incoming request at a point-of-contact server to provision a user within a domain, wherein the domain is associated with a plurality of domains within a federated computing environment;
   validating at a trust proxy one or more security assertions received at the domain through the point-of-contact server; and
   responsive to provisioning the user within the domain, initiating a provisioning operation in at least one other domain in the plurality of domains within the federated computing environment by sending a provisioning request;
   the provisioning request associated with a provisioning operation being one of: creation of a user record, pushing updated user attributes to a user record, pulling updated user attributes for a user record, deletion of a user account, and unlinking of one or more user accounts.

20. The computer program product on a non-transitory computer readable medium of claim 19 where security assertions are distinct from the user-specific information contained in the provisioning request.

21. The computer program product on a non-transitory computer readable medium of claim 19 wherein the trust proxy applies an authorization decision to the incoming request.

22. The computer program product on a non-transitory computer readable medium of claim 19 wherein the incoming request is interpreted as initiating a request for user-specific information and/or attributes about the user from the domain.

23. The computer program product on a non-transitory computer readable medium of claim 19 wherein the method further comprises:
   extracting user-specific information that is associated with the user from the provisioning request;
   performing the provisioning operation by invoking an identity management application within the domain;
   creating, modifying, or deleting one or more user-specific entries in one or more datastores for the user by the identity management application.

24. The computer program product on a non-transitory computer readable medium of claim 19 wherein the method further comprises:
   extracting user-specific information that is associated with the user from the provisioning request;
   creating, modifying, or deleting one or more user-specific entries in one or more datastores for the user;
   detecting the user-specific activity within the domain by the identity management application; and
   provisioning the user within the domain such that the user subsequently has access to controlled resources within the domain.

25. The computer program product on a non-transitory computer readable medium of claim 19 wherein the provisioning operation is initiated in an automated manner in response to provisioning of the user within the domain.

* * * * *